(12) United States Patent
Vezier et al.

(10) Patent No.: US 12,481,523 B2
(45) Date of Patent: Nov. 25, 2025

(54) FLEXIBLE LOGIC UNIT ADAPTED FOR REAL-TIME TASK SWITCHING

(71) Applicant: SILICON MOBILITY SAS, Valbonne (FR)

(72) Inventors: Loïc Jean Dominique Vezier, La Roquette sur Siagne (FR); Bruno Bernard Jacques Sallé, Marseilles (FR); Anselme Joseph Francis Lebrun, Mougins (FR)

(73) Assignee: Silicon Mobility SAS, Valbonne (FR)

( * ) Notice: Subject to any disclaimer, the term of this patent is extended or adjusted under 35 U.S.C. 154(b) by 533 days.

(21) Appl. No.: 16/958,257

(22) PCT Filed: Dec. 18, 2018

(86) PCT No.: PCT/EP2018/085476
§ 371 (c)(1),
(2) Date: Jun. 26, 2020

(87) PCT Pub. No.: WO2019/129538
PCT Pub. Date: Jul. 4, 2019

(65) Prior Publication Data
US 2020/0334081 A1    Oct. 22, 2020

(30) Foreign Application Priority Data

Dec. 26, 2017  (EP) .................................. 17210568
Mar. 15, 2018  (WO) ................. PCT/EP2018/056477

(51) Int. Cl.
*G06F 9/48* (2006.01)
*G06F 3/06* (2006.01)
(Continued)

(52) U.S. Cl.
CPC .......... *G06F 9/4881* (2013.01); *G06F 3/0611* (2013.01); *G06F 3/0647* (2013.01);
(Continued)

(58) Field of Classification Search
CPC ........ G06F 9/24; G06F 3/0679; G06F 3/0611; G06F 3/0647; G06F 9/461; G06F 9/4881;
(Continued)

(56) References Cited

U.S. PATENT DOCUMENTS 5,592,105 A * 1/1997 Cheung .................... G06F 30/34
326/46
6,107,821 A * 8/2000 Kelem ............. H03K 19/17756
326/38

(Continued)

FOREIGN PATENT DOCUMENTS

CN   104620217 A   5/2015
EP   0405726 A2   5/1990
(Continued)

OTHER PUBLICATIONS

Scalera, et al., "The design and implementation of a context switching FPGA", FPGAS for Custom Computing Machines, 1998. Proceedings. IEEE Symposium on Napa Valley, CA, USA Apr. 15-17, 1998, Los Alamitos, CA, USA,IEEE Comput. soc, US, Apr. 15, 1998, pp. 78-85, XP010298158.

(Continued)

*Primary Examiner* — Chun Kuan Lee
(74) *Attorney, Agent, or Firm* — Viering, Jentschura & Partner mbB

(57) ABSTRACT

The invention applies to the context of an electric machine system where the digital control is handled with a FPCU component. This applies to application domains like but not limited to the automotive domain. The invention enables fast and safe time sliced context switching for application tasks mapped in FLU e FPGA matrix, similar as for the task context switching in a microprocessor, with the goal to maximize the usage of all computation resources of the FLU over time.

7 Claims, 24 Drawing Sheets

(51) Int. Cl.
    *G06F 9/24* (2006.01)
    *G06F 9/46* (2006.01)
(52) U.S. Cl.
    CPC .............. *G06F 3/0679* (2013.01); *G06F 9/24* (2013.01); *G06F 9/461* (2013.01)
(58) Field of Classification Search
    CPC ...... H03K 19/17764; H03K 19/017581; B60L 15/20
    USPC ......................................................... 718/108
    See application file for complete search history.

(56) References Cited

U.S. PATENT DOCUMENTS

| | | | |
|---|---|---|---|
| 6,175,247 B1 * | 1/2001 | Scalera ............ | H03K 19/17756 326/39 |
| 7,454,546 B1 * | 11/2008 | Lilley ................. | G06F 13/1605 710/243 |
| 8,095,782 B1 * | 1/2012 | Danskin .................. | G06F 9/461 712/228 |
| 9,900,006 B2 * | 2/2018 | Kurokawa ......... | H03K 19/1776 |
| 10,459,509 B2 * | 10/2019 | Maiyuran ............. | G06F 1/3243 |
| 10,540,200 B2 * | 1/2020 | Cheng .................... | G06F 9/461 |
| 2001/0010074 A1 | 7/2001 | Nishihara et al. | |
| 2010/0257335 A1 | 10/2010 | Hanai et al. | |
| 2014/0006887 A1 * | 1/2014 | Greene ............. | G01R 31/3177 714/727 |
| 2014/0075087 A1 | 3/2014 | Bartling et al. | |
| 2015/0091613 A1 | 4/2015 | Tahiri et al. | |
| 2015/0303926 A1 | 10/2015 | Tahiri et al. | |
| 2016/0335133 A1 | 11/2016 | Mckenney | |
| 2016/0380635 A1 | 12/2016 | Roberts | |
| 2017/0288670 A1 * | 10/2017 | Kozuma .......... | H03K 19/17728 |

FOREIGN PATENT DOCUMENTS

| | | |
|---|---|---|
| EP | 3157172 A1 | 4/2017 |
| JP | 19970016409 A | 8/1998 |
| JP | 2001202236 A | 7/2001 |
| JP | 2003150390 A | 5/2003 |
| JP | 2006282072 A | 10/2006 |
| JP | 2010244238 A | 10/2010 |
| JP | 2017188881 A | 10/2017 |

OTHER PUBLICATIONS

European Patent Office Search Report mailed Mar. 25, 2019, in reference to co-pending European Patent Application No. PCT/EP2018/085476 filed Dec. 18, 2018.

European Patent Office Search Report mailed Sep. 20, 2018, in reference to co-pending European Patent Application No. PCT/EP2018/056477 filed Mar. 15, 2018.

Notice of Reasons for Refusal issued for the parallel Japanese patent application No. 2020535647, dated Nov. 29, 2022, 7 pages (for informational purposes only).

Search Report by Registered Search Organization issued for the parallel Japanese patent application No. 2020535647, dated Nov. 16, 2022, 29 pages (for informational purposes only).

* cited by examiner

FLEXIBLE LOGIC UNIT ADAPTED FOR REAL-TIME TASK SWITCHING

FIELD OF THE INVENTION

The invention applies to the context of an electric machine system where the digital control is handled with a FPCU component. This applies to application domains like but not limited to the automotive domain.

BACKGROUND OF THE INVENTION

Nowadays, the number of electronic control units (ECU) in the vehicles in getting higher and higher. This situation became problematic for car makers because of cost and reliability of this multiplicity of independent ECUs.

So, the trend in this domain is to try to reduce the number of Electronic modules as much as possible.

However, the number of power-train elements to be controlled is constantly increasing because of global electrification of actuators and integration of ADAS functions.

Therefore, the only possible way is to be able to gather multiple different functions inside a single ECU.

If we consider a pure software controller, the solution comes from increasing the number of CPU cores, increasing the CPU operating frequency and applying state of the art multi-processing and multi-tasking mechanism.

But, if we consider an FPGA based controller, and specifically a FPCU device, the problem is more complex. The state of the art on this domain is:
  Either the FPGA size is made bigger and the multiple tasks are simply mapped side-by-side in the FPGA. This solution is too expensive to be a realistic production solution.
  Or the FPGA content is re-loaded each time a task switching is required. But his method is far too slow for a fast real time operating system as the one we have in automotive ECUs. It is too slow because it is necessary to stop the activity of the FPGA during the application loading period. Also, the method does not cover the need for application data save and restore. So this mechanism must be implemented as part of the application itself which costs a lot in terms of FPGA resources occupation and increase the context switching delay.
FIG. 16 explains the different solutions:
First line show what happens is an old technology FPGA. This one is relatively slow. So a typical real time iterative task will consume all the processing power. In this case context switching is not applicable.
Second line explains the way this same task behaves when executed on a modern technology FPGA. It is obvious that most of the computing power is lost and could be used for other purpose.
The third line is what we could achieve with conventional "context switching". In this case the benefit is very limited. The switching delay is not-acceptable.
The fourth line is what this invention aim at: almost instant context switch.

The description further entirely in corporates by reference US 2015/0091613 related to flexible logic units.

It is worth noting that the prior-art does not
(a) provide solutions for a technically complex context wherein many different tasks must be executed and hence besides the matrix memory external thereto is required, more in particular a suitable data transfer back and forth between said matrix and memory in the context of context switching.
(b) take in consideration the need for high fault tolerance requirements as required in the target domain.
(c) provide other advantageous uses such as one which enhance safe execution and/or provide low power consumption.

Aim of the Invention

The invention overcomes the problem indicated above and the shortcomings of the prior-art.

SUMMARY OF THE INVENTION

Generally speaking the invention target arrangements wherein the amount of tasks that can be handled are virtually unlimited, in reality determined by the size of the memory provided externally to the matrix, and provides data store and restore circuits (and connections therein between) are provided for (i) pre-loading data related to one task from said memory into said data and restore circuit and/or (ii) post-storing of data related to one task in said data store and restore circuit to said data memory, whereby said pre-loading and/or post-storing can be performed while another task is executed without disturbing said task execution.

Further the invention provides methods for fault tolerance enhanced sequentially execution of at least two tasks on arrangements, being based on putting configuration bit storage circuits in operating conditions with highest fault tolerance as much as possible.

Further the invention discusses particularities in relation to low power consumption by considering the requirement when the matrix is set to be in active temporality, in particular by pointing out that said data memory has to be a (on-chip) non-volatile memory.

The invention also provides solutions for providing safe execution wherein tasks are the same and compared and in essence local storage features of the data store and restore circuit is to be emphasized.

Finally an output circuits required to ensure safe operation in case of task switching are also disclosed.

First the invention enables fast and safe time sliced context switching for application tasks mapped in FLU eFPGA matrix, similar as for the task context switching in a microprocessor, with the goal to maximize the usage of all computation resources of the FLU over time.

Second the invention provides embodiments compatible for use in flexible logic as described in US 2015/0091613.

Thirdly this context switching infrastructure apparatus can be adapted at low cost to include strong functional safety check mechanisms in FLU.

Generally speaking, the invention entails three separate circuits (with themselves having various embodiments) and various arrangement or combinations of those:
  A configuration bits circuit and a "double-latch" daisy chain arrangement thereof.
    It manages the sets of configuration bits that configure the eFPGA matrix into the logic function necessary to execute the FLU mapped task.
  A data circuit and a "double-flop" daisy chain arrangement thereof.
    This one manages the FLU mapped task context data save and restore.
  A task aware FLU output circuit or port This one manages the way application result is transferred to the outside of the FLU with regard to task switching concept.

More generically speaking the invention provides for

An arrangement, comprising (i) a system with (a) a plurality of programmable logic units (configurable look-up table, multiplexer arrangements, SPU's (signal processing units), math operators, . . . ) and (b) a plurality of first one bit clocked storage elements, said programmable logic units and first one bit clocked storage elements being arranged in an array (to operate together as programmable logic), the arrangement being adapted for sequentially execution of at least two tasks, whereby for each of said first one bit clocked storage elements a data store and restore circuit is provided for local storing or restoring the respective values per task of said first one bit clocked storage elements.

An arrangement, preferably combined with the above arrangement, comprising a configuration bit memory whereby for each of said programmable logic unit, a configuration bit storage circuit is provided, wherein said configuration bit storage circuits, and an overall control system is further provided for controlling said configuration bit storage circuit; and said overall control system comprising input means for receiving instructions and circuitry, acting in accordance with said received instructions, being capable to further generate clock signals for said configuration bit circuit.

The invention further provides computer program products comprising computer-readable code (such as micro-programmed logic), that when run by an overall control system for any of the arrangement as describes above causes execution of the particular switching methods. In the alternative said overall control system comprises specific designed state machines to cause execution of the particular switching methods instead. Also combinations are possible.

The invention further provides specific method for sequentially execution of at least two tasks on the described arrangements with use of the controller for (a) while one task is executed storing locally a configuration related to another task (in said configuration bit storage circuit) (b) thereafter and preferable within one clock cycle configure said programmable logic units based on said configuration to be able to execute said other task; and (c) then directly start execution of said other task. Moreover while said one task is executed, to prepare for restoring the respective values related to said other task in said first one bit clocked storage elements; (b) thereafter and preferably within one clock cycle, store those values of said other task in said first one bit clocked storage elements while storing the values of said one task (locally). This last step happens simultaneously with the configuration step. In certain embodiments said configuration is loaded from a configuration memory but this is not always necessary. In certain embodiments the values are stored outside the matrix and then prepare to restore requires fetching from a memory outside the memory. This is again not always necessary.

ADDENDUM TO THE FIGURES

Figure 10:
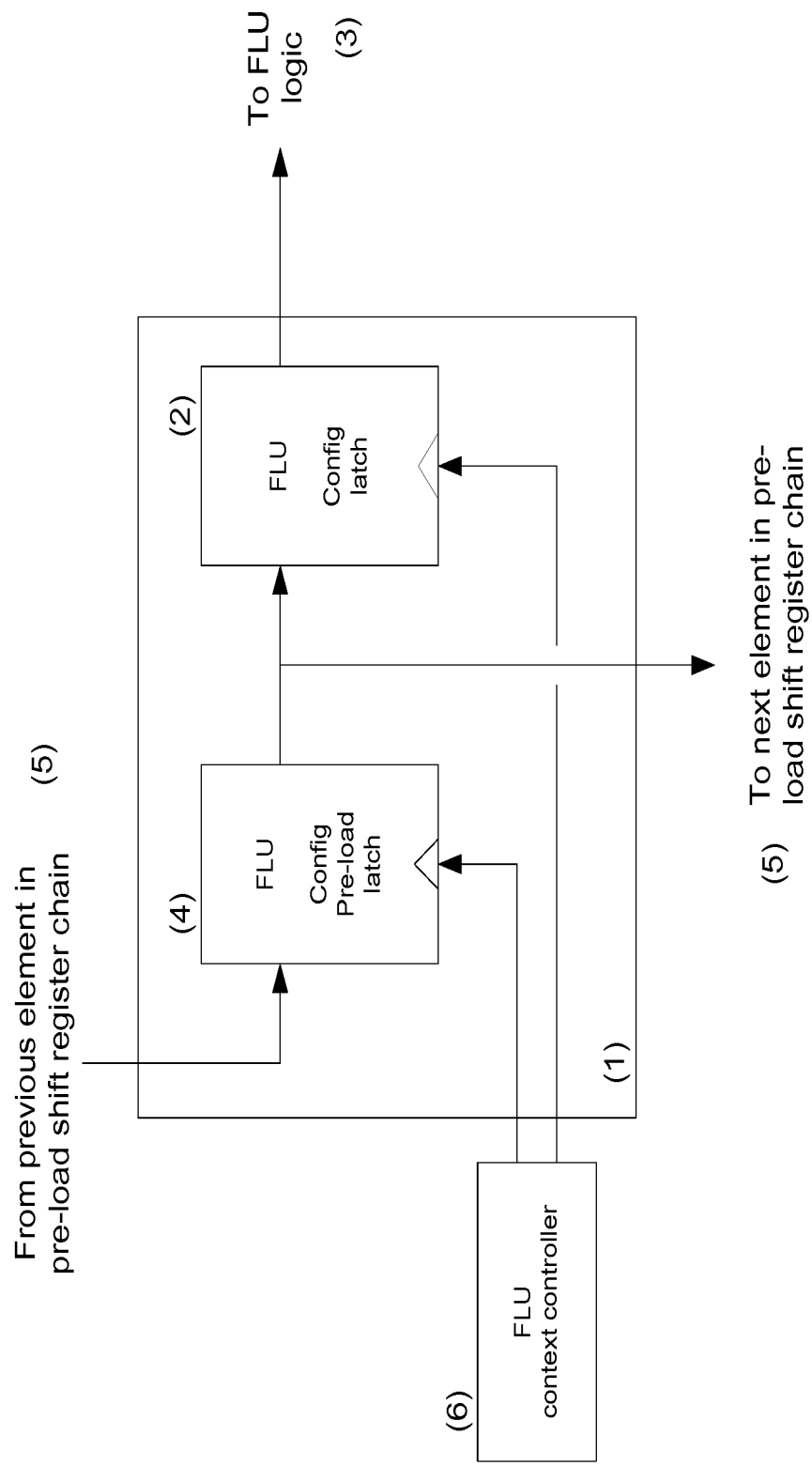
FIG. 10 describes a circuit in accordance with the embodiment of FIG. 6 top.
Figure 11:
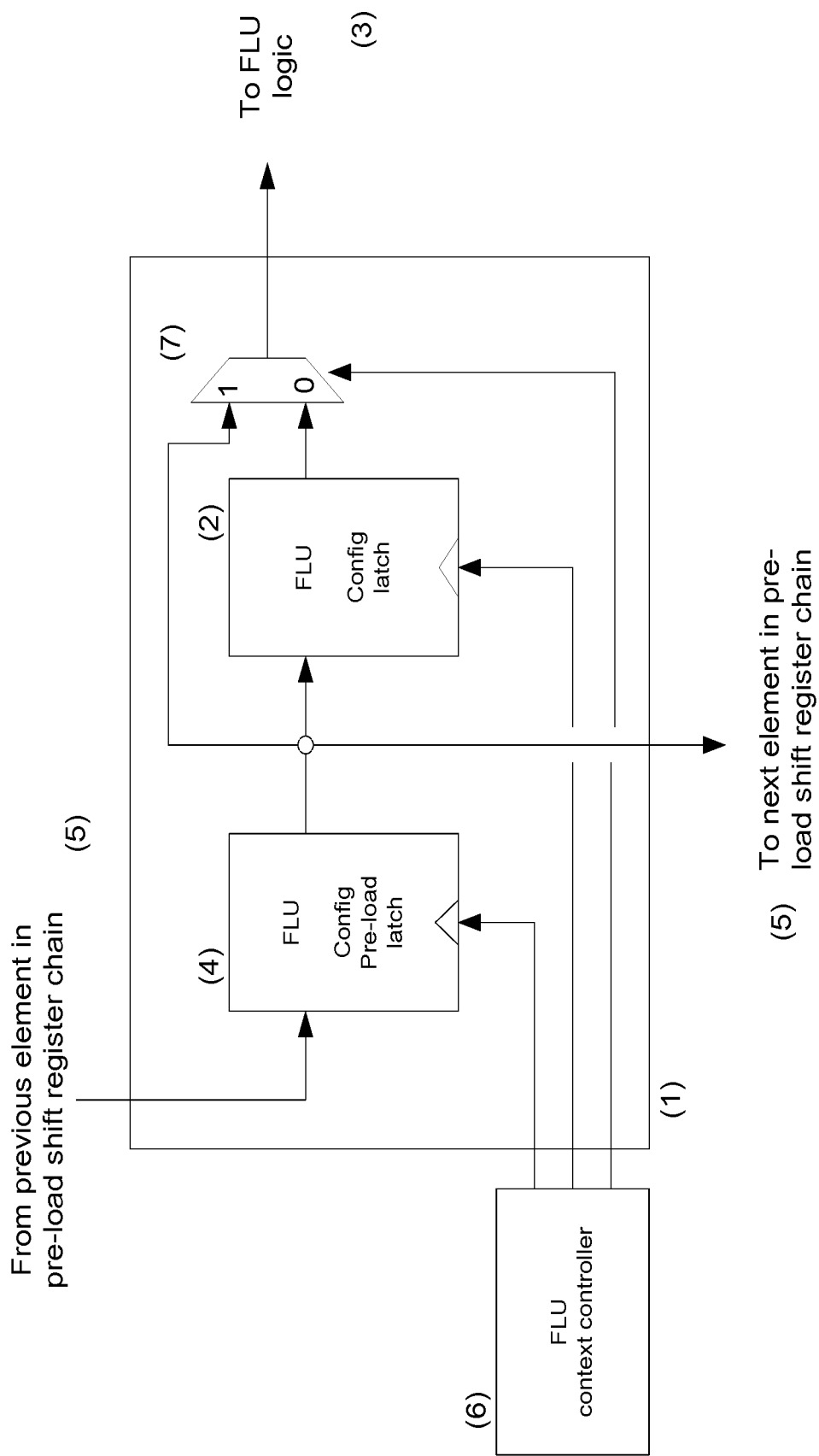
FIG. 11 describes a circuit in accordance with the embodiment of FIG. 6 bottom.
Figure 12:
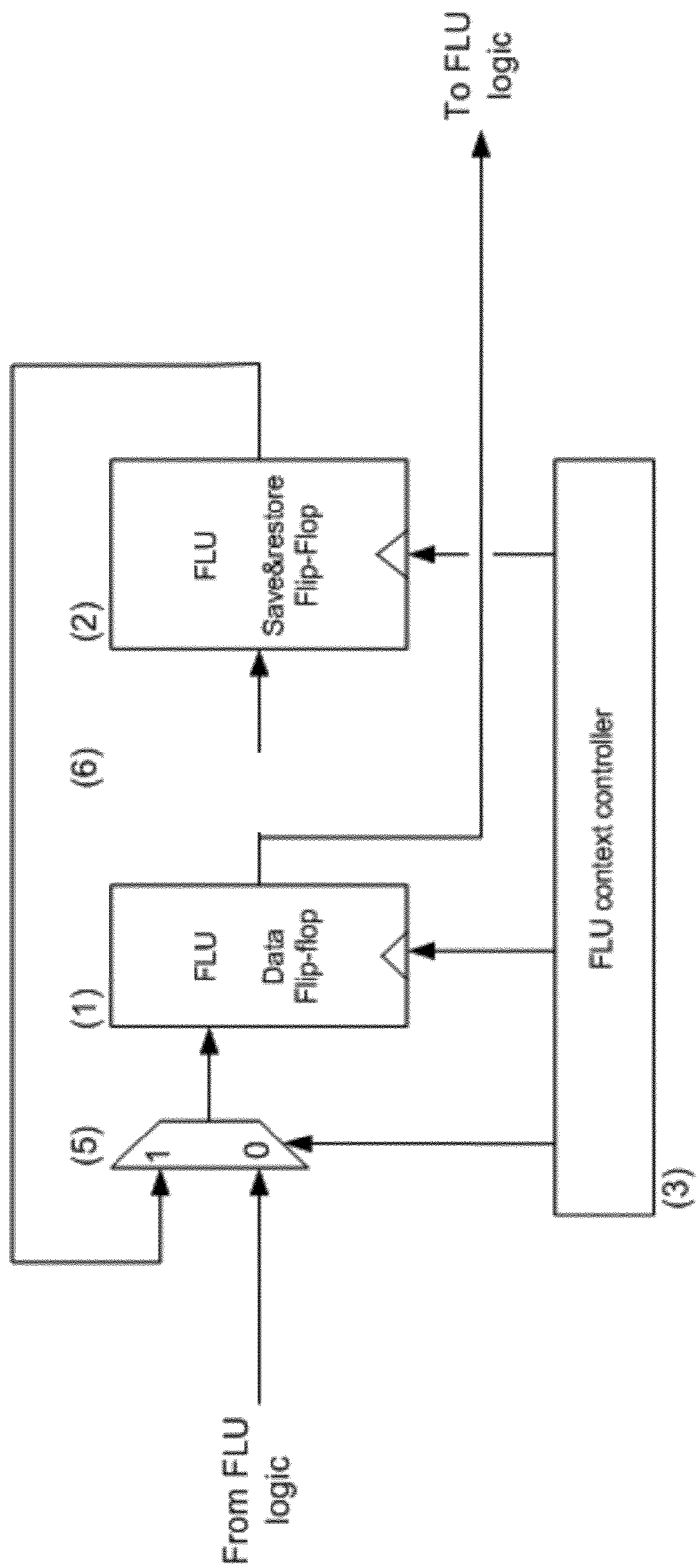
FIG. 12 describes another alternative circuit.

FIG. 10
(1) configuration bit storage circuit
FLU (Field programmable logic unit)-Config(uration) latch
To FLU (Field programmable logic unit) logic
FLU (Field programmable logic unit)-Config(uration) pre-load latch
Top (5) From previous element in pre-load shift register chain
Bottom (5) To next element in pre-load shift register chain
(6) FLU (Field programmable logic unit) context controller FIG. 11
(1) configuration bit storage circuit
FLU (Field programmable logic unit)-Config(uration) latch
To FLU (Field programmable logic unit) logic FLU (Field programmable logic unit)-Config(uration) pre-load latch Top (5) From previous element in pre-load shift register chain Bottom (5) To next element in pre-load shift register chain (6) FLU (Field programmable logic unit) context controller (7) Switching Element-Selector-Demultiplexer

FIG. 12

(1) FLU (Field programmable logic unit) Data Flip-Flop
(2) FLU (Field programmable logic unit) Save&Restore Flip-Flop
(3) FLU (Field programmable logic unit) context controller
(5) Switching Element-Selector-Demultiplexer

FIG. 13

(1) FLU (Field programmable logic unit) Data Flip-Flop
(2) FLU (Field programmable logic unit) Save&Restore Flip-Flop
(3) FLU (Field programmable logic unit) context controller
(5) Switching Element-Selector-Demultiplexer
(6) Switching Element-Selector-Demultiplexer Top (7) From previous element in save&restore shift register chain Bottom (7) To next element in save&restore shift register chain

FIG. 14

(10) FLU (Field programmable logic unit) context controller
(12) Communication to on-chip non-volatile memory
(11) register like organization of circuits in array

FIG. 15

(1) The FLU (Field programmable logic unit) output retention Flip-Flop
(2) Switching Element-Selector-Demultiplexer
(3) FLU (Field programmable logic unit) context controller

DETAILED DESCRIPTION OF THE INVENTION

The invention relates to electric circuits, electronic systems comprising those one or more of those circuits and arranged in a particular way, and arrangements comprising such electronic system and suitable memory elements, connected thereto. More in particular these inventions are made in the context of flexible logic units, having configurable logic.

The above circuits, systems and arrangements are suitable for use as (electric) engine control hardware and are hence adapted to provide real-time control features. More in particular these inventions are made in the context of enabling execution of a plurality of tasks by such flexible logic units without jeopardizing such real-time control features.

Alternative said platform is provided, suitable for automotive, comprising an electric power train; and an electric power train management hardware, providing control for said electric power train, said management hardware comprising a heterogeneous hardware system comprising at least one software programmable unit and at least one hardware programmable unit, comprising any of the arrangements discussed.

The above indicates that switching the task to be executed needs to be provided again without jeopardizing such real-time control features. The problems to be solved are twofold. First the performing of the task by a flexible logic unit is dictated by its configuration, so (fast) (re-)configuring is needed. Second while a task is executed data or values are computed by the flexible logic unit and store at a variety of places in said flexible logic unit. So (fast) storing of said data or values (till the task restarts) and/or (fast) loading of said data or values (at the task restart) is required also.

It is worthwhile to explore the typical architecture and elements for which the inventions are designed. In essence a flexible logic unit comprises of programmable logic units and one bit clocked storage elements, arranged in a matrix or array, to operate together as programmable logic unit. Said programmable logic units are configurable. Said one bit clocked storage elements hold the data or values described above generated by said programmable logic units. Further extra one bit clocked storage elements, adapted for holding configuration bits for said programmable logic units, are part of said matrix. While the configuration info (bits) and said data or values are hence locally stored in the matrix, these are or can originate from memories outside the matrix. Indeed for the configuration info a configuration memory is part of the arrangement and also a data or value memory is part of the arrangement, for loading such data from or storing such data in. Operations to such memory are hence not local. To prevent the use of lots of circuit area for direct access at each point of the matrix to such memories architectures exist which flow configuration and data through the matrix, however at the expense that such loading or storing requires many clock cycles.

In summary so far it can be said that the invention provides solutions for using flexible logic units in the context of task switching (including the context, defined by the values or data mentioned above, switching) without jeopardizing such real-time control features by addressing the local storage needs required by this. Further the invention addresses the aspect of global (outside the matrix) loading or fetching or storing while still using the (circuit area) benefits of through matrix flow thereof by overcoming the drawbacks of the multi-cycle consequences orientating therefrom.

In essence the invention defines an arrangement, comprising (i) a system with (a) a plurality of programmable logic units (such as configurable look-up table and multiplexer arrangements) and (b) a plurality of first one bit clocked storage elements, said programmable logic units and first one bit clocked storage elements being arranged in an array (to operate together as programmable logic), the arrangement being adapted for sequentially execution of at least two tasks, whereby for each of said first one bit clocked storage elements a data store and restore circuit is provided for local storing or restoring the respective values per task of said first one bit clocked storage elements.

Moreover the arrangement further comprising for (essentially) each of said programmable logic units, a configuration bit storage circuit is provided, to (i) store a configuration bit (from memory); or (ii) load a configuration bit (to be applied to the programmable unit).

It is worthwhile pointing out at this stage that the involved one bit clocked storage elements are typically flip flops. The involved switching elements or selectors are typically multiplexer or de-multiplexers. In invention is realized by the particular layout or arrangement of those elements, in particular in that locally the operations can occur in a limit amount of clock cycles, preferably in 1 clock cycle. Moreover these circuits are designed with particular inputs and outputs such that those can be connected in series to shift information from one to the other, thereby providing yet another type of specific layout or arrangements of those circuits. Note that as indicated such series approach leads to many clock cycles in moving data or configuration info from or to the memory external to the matrix. While this in principle does not pose a principle problem due to the local storage capabilities just described, one may prefer to put a limit to those lower than the physical limit dedicated by the dimensions of the matrix by arranging at the expense of circuit area the memory and a plurality of said configuration bit storage circuits and/or data store and restore circuit to enable parallelization of said store operations.

Figure 1:
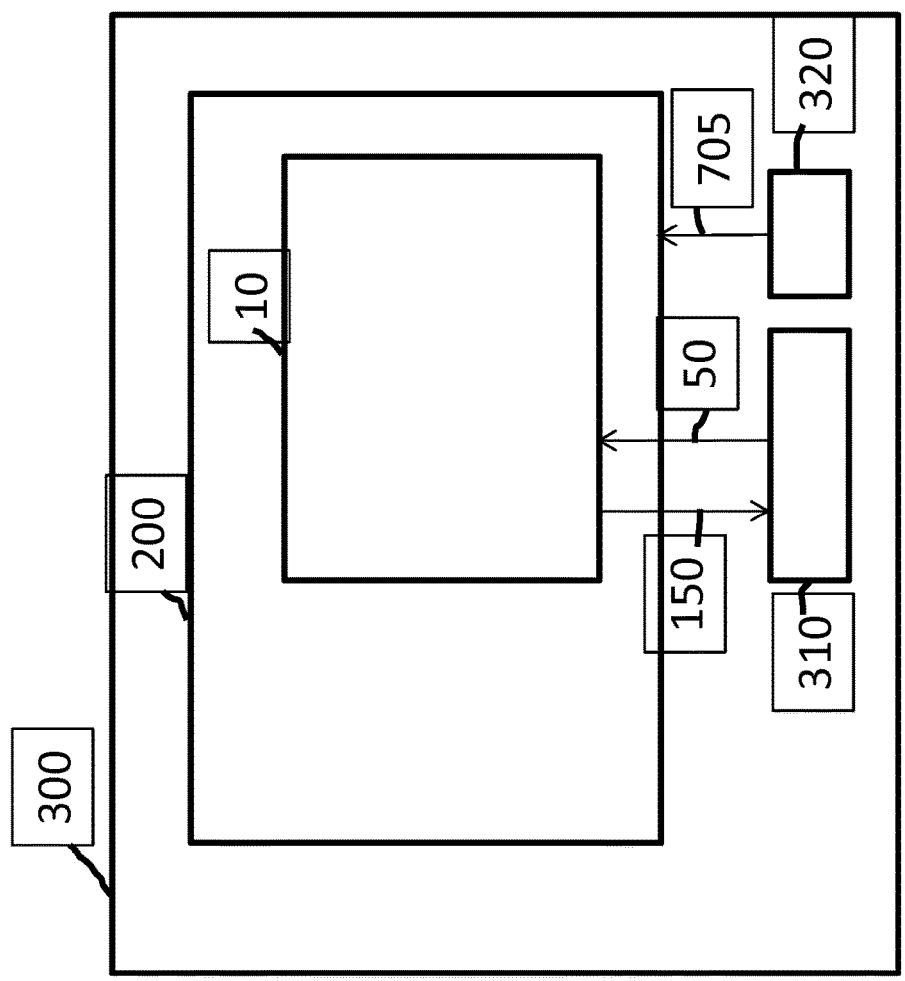
FIG. 1 describes schematically the arrangement, system, circuits and storage elements relationship discussed throughout the further description.

As shown in FIG. 1, the invention can be described at the level of an arrangement (300), comprising a system or matrix (200), itself comprising circuits, such as the data store and restore circuit (10) and a data memory (310) from which data can be loaded or to which data can be stored, and also a configuration bit memory (320) from which configuration bits can be loaded. More details are provided further.

Figure 2:
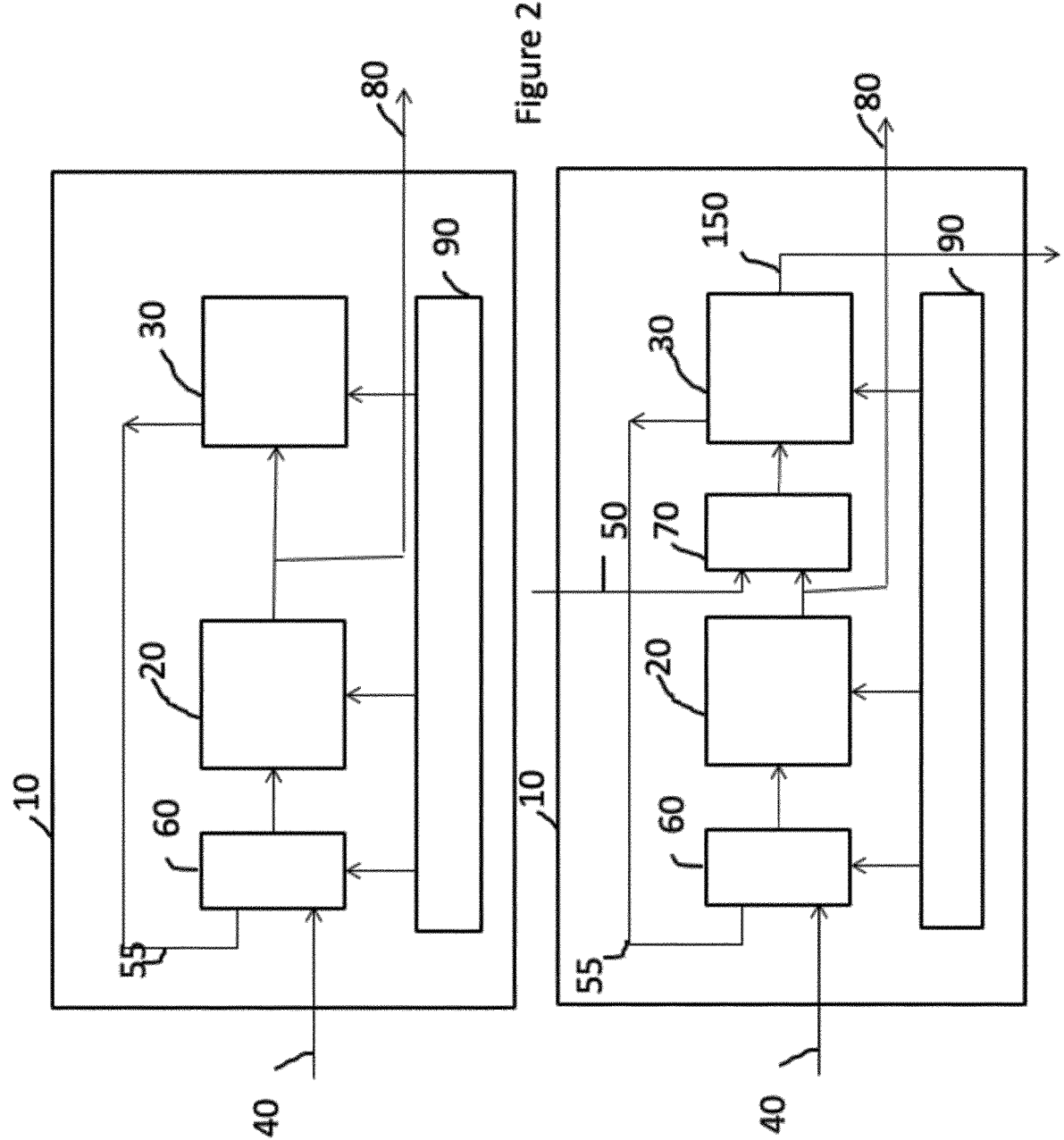
FIG. 2 top and bottom illustrates schematically embodiments of the data storage aspect circuits.
Figure 3:
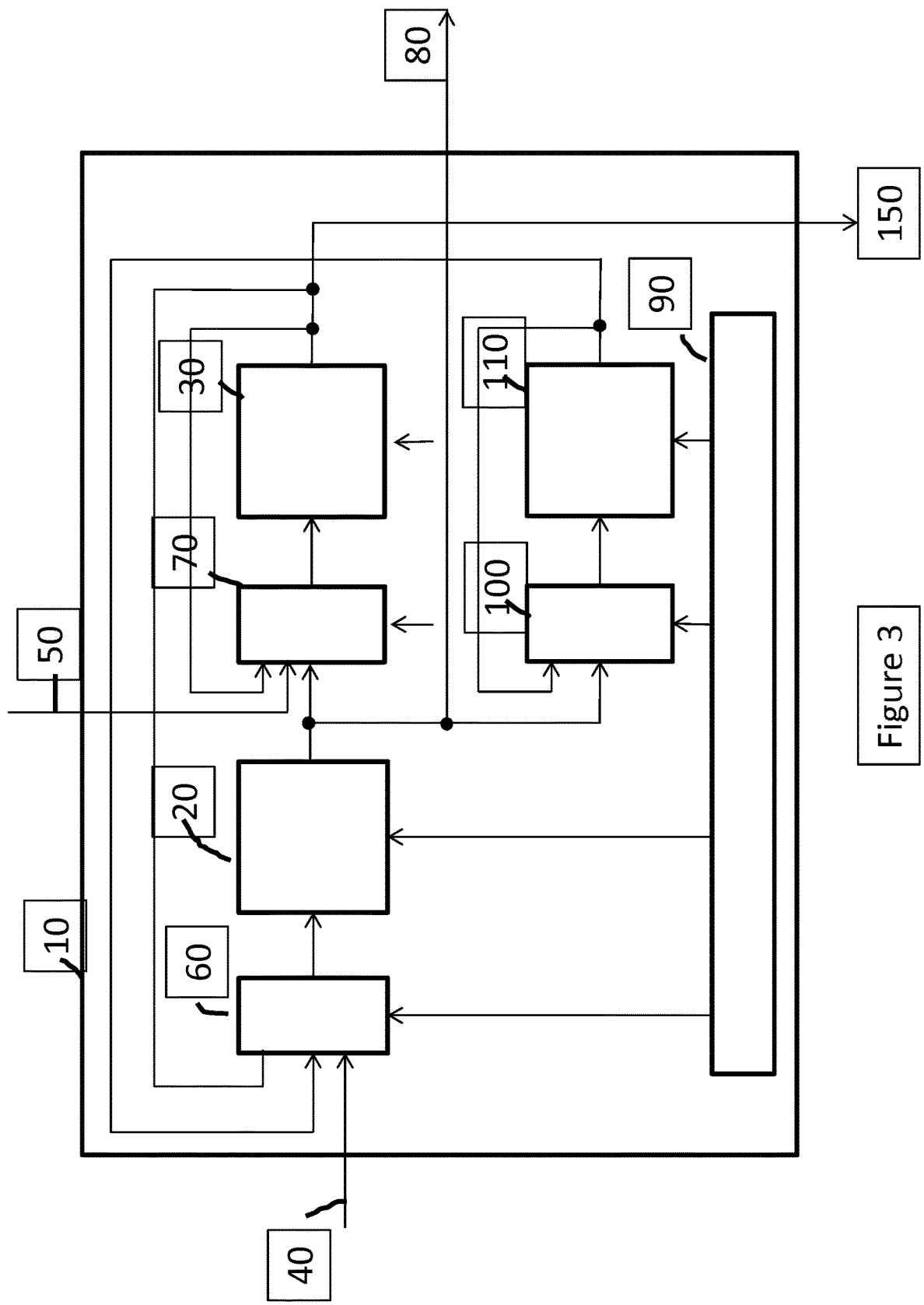
FIG. 3 illustrates schematically another embodiment of the data storage aspect circuits.
Figure 5:
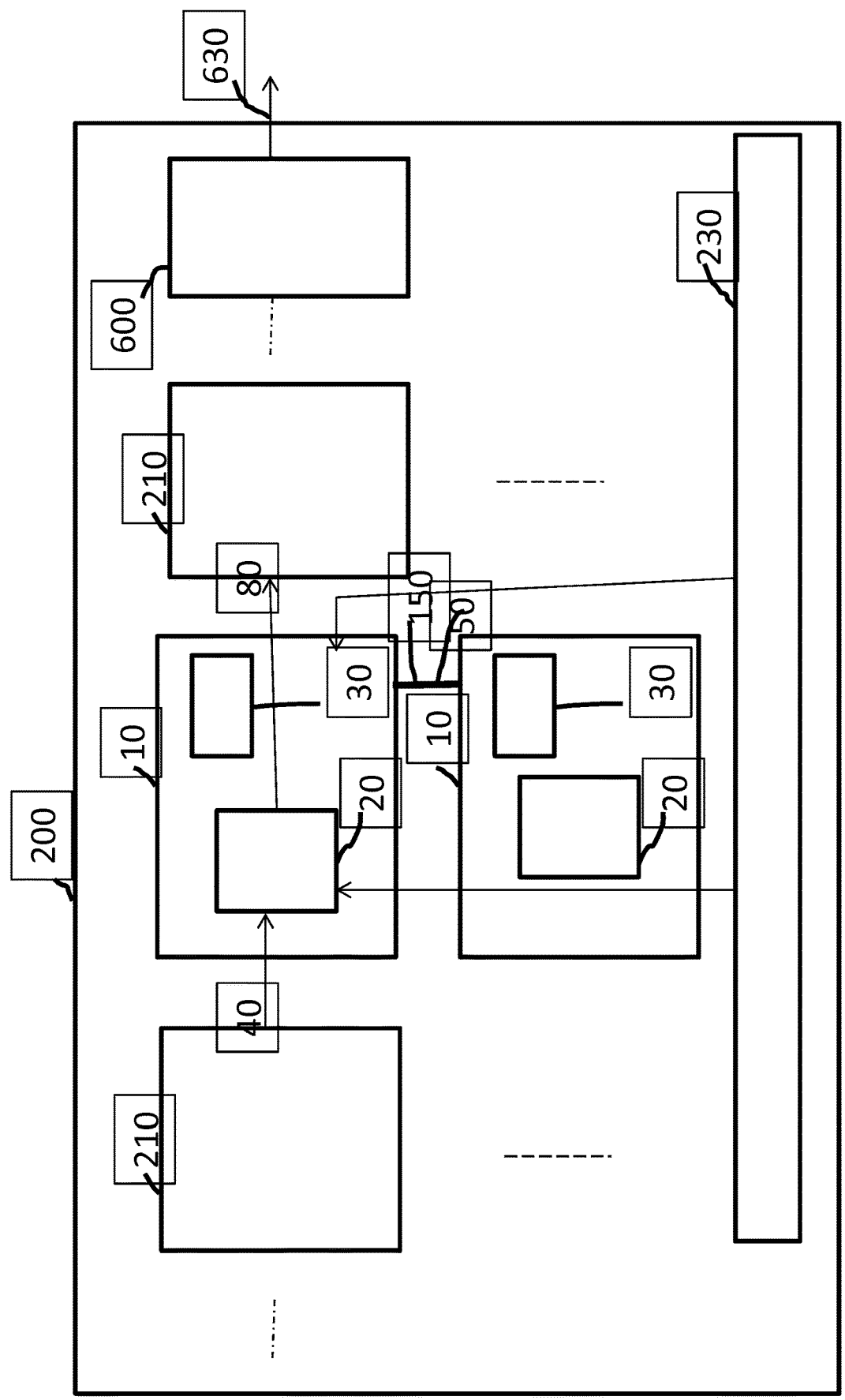
FIG. 5 describes schematically the organization of the above data circuits and related controllers in an array.

Various embodiments of the data store and restore circuit (10) are provided in FIG. 2 top, bottom and FIG. 3 while FIG. 5 shows the embedding of those in a matrix (200) and the layout of such matrix connecting the programmable logic (210) with the data store and restore circuit (10). Note in particular the connection between the two circuits (10).

Figure 6:
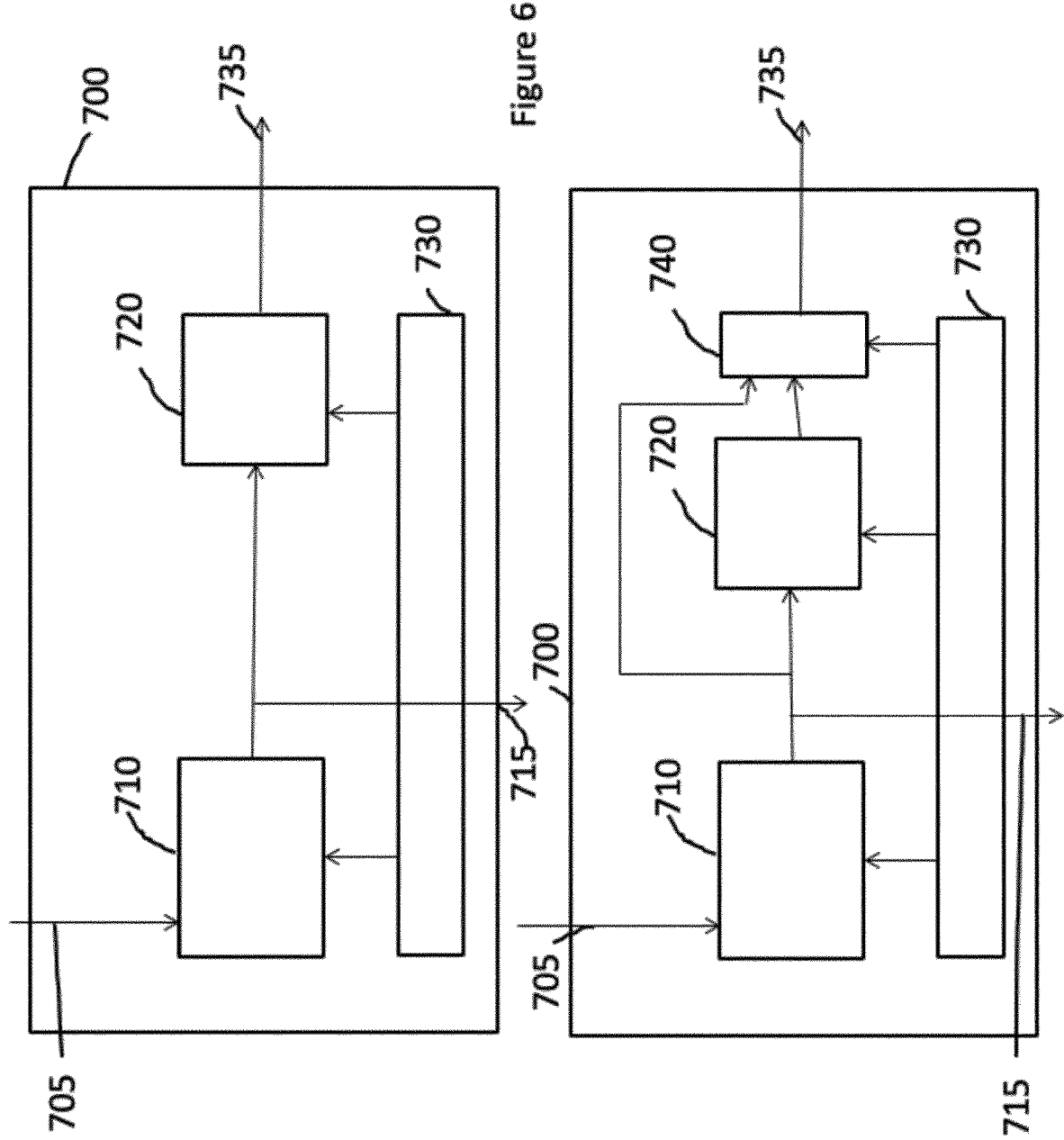
FIG. 6 top and bottom illustrates schematically embodiments of the configuration storage aspect circuits.
Figure 7:
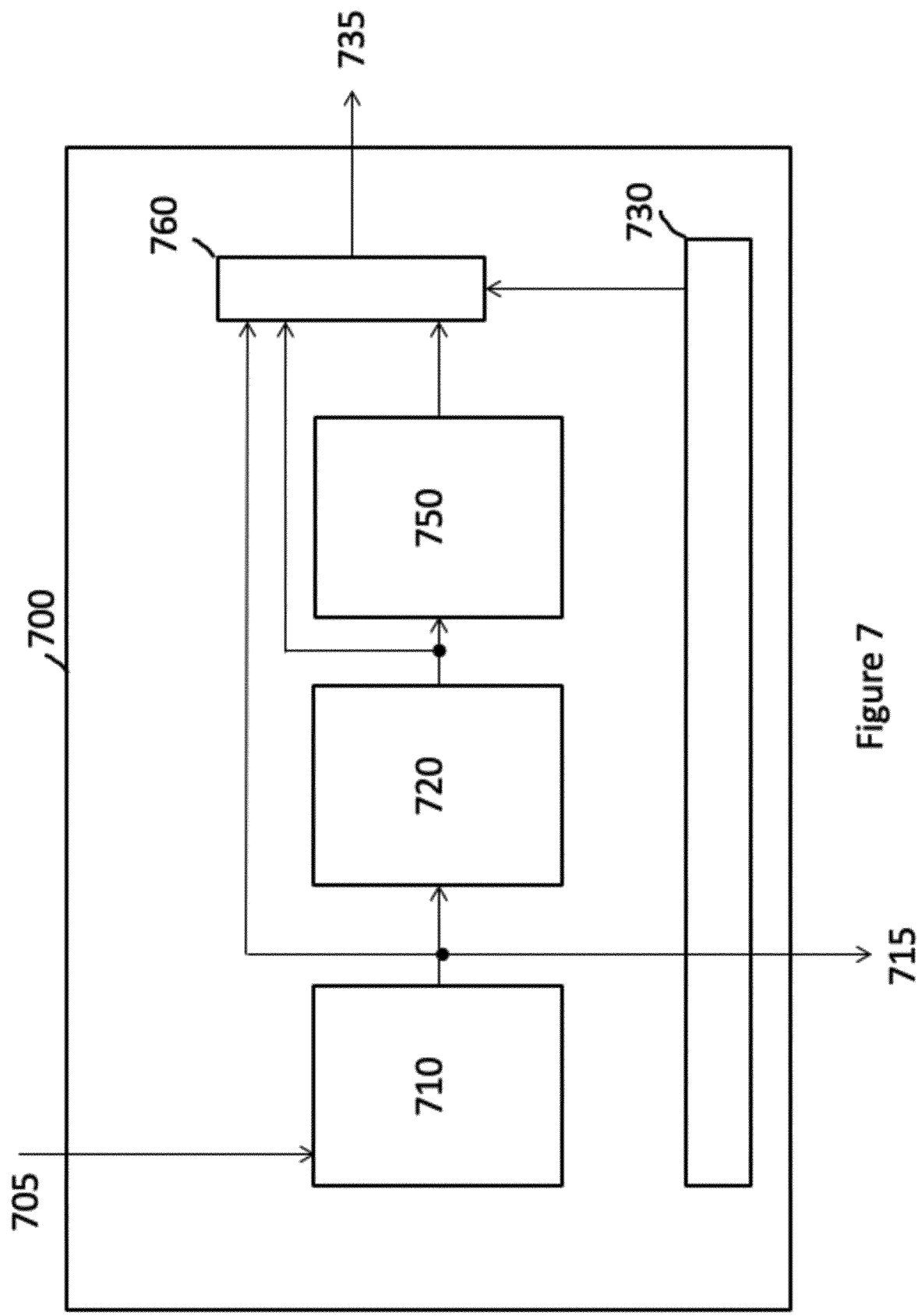
FIG. 7 illustrates schematically another embodiment of the data storage aspect circuits.
Figure 8:
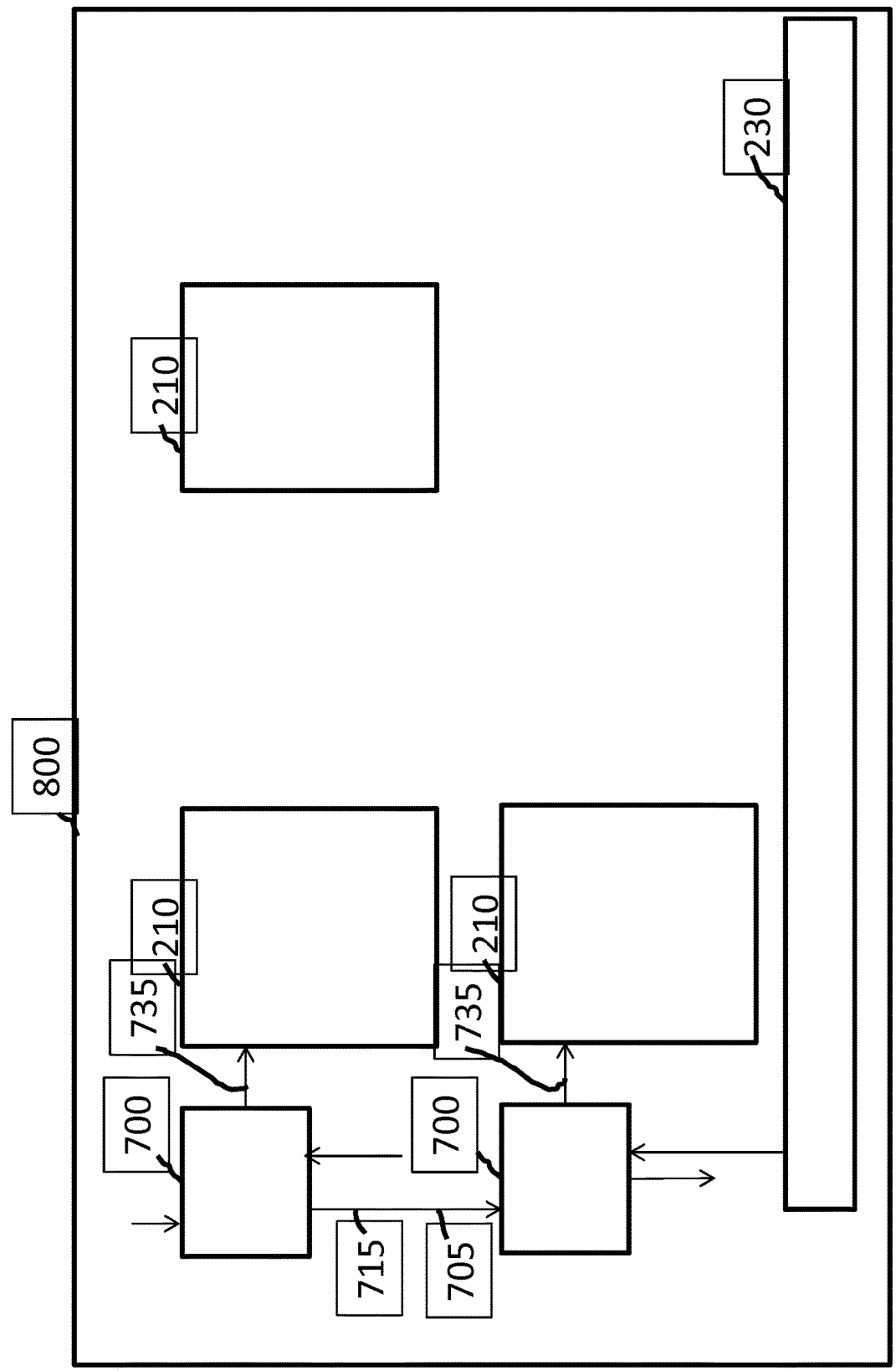
FIG. 8 describes schematically the organization of the above configuration circuits and related controllers in an array.
Figure 9:
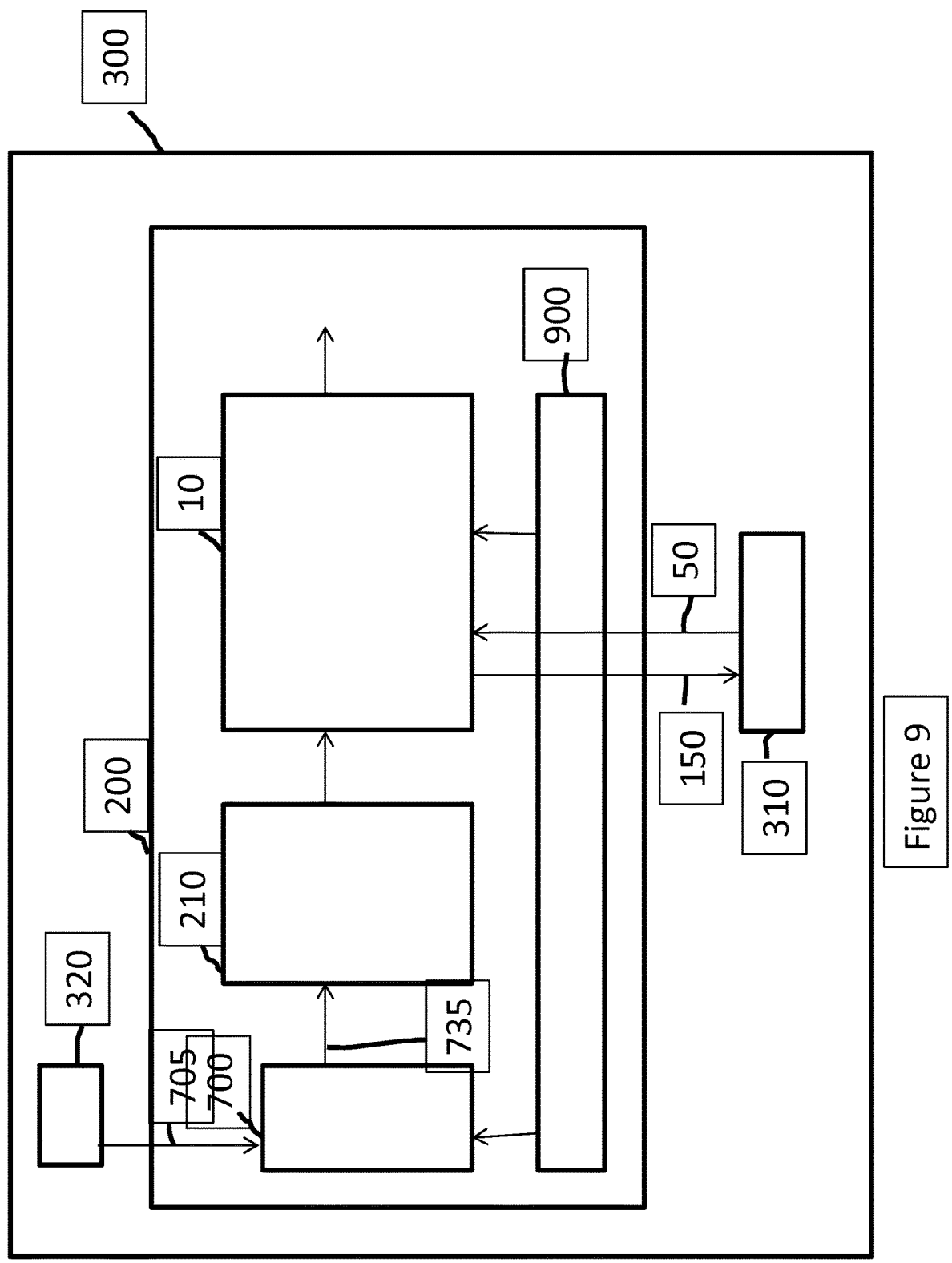
FIG. 9 describes schematically the organization of the both the data and configuration circuits, related controllers and involved storage elements in an array.

Various embodiments of the configuration bit storage circuit (700) are shown in FIG. 6 top, bottom and FIG. 7 while FIG. 8 shows the embedding of those in a system or matrix (800) and the layout of such matrix connecting the same programmable logic (210) (but now for the purpose of providing the configuration to said logic) with this configuration bit storage circuit (700). Note in particular the connection between the two circuits (700). FIG. 9 shows then the overall system with the both the data store and restore circuit (10) and the configuration bit storage circuit (700) (without showing the matrix concept here) but indicate that the control circuit (900) controls both circuits, said control circuit (900) encompassing the functionality of the control circuits (90), (640), (230) and (730) further detailed below.

For sake of completeness, for all shown embodiments variants exist in the sense that around the flip-flop a feedback loop can be provided (as illustrated in FIG. 3) used in case the clock of the flip-flop (30) is always running. The loopback allows to maintain the flop data whatever clock activity.

In an alternative embodiment this loopback is not present nor necessary if you consider that the clock is active only when necessary. Both strategies are equivalent functionally.

In a preferred embodiment however, in implementation preference is given to control the clocks as less as possible.

Description of the First Aspect of the Invention Related to the Data

The invention is now further detailed with respect to the first aspect of the invention related to the data.

As shown in FIG. 2 top, the invention provides for a circuit (10) comprising (i) a first one bit clocked storage element (20); (ii) at least one second one bit clocked storage element (30), (iii) a first (logic) input (40), (iv) optionally (FIG. 2 bottom) a second (value) input (50), (v) a first switching element (60) for selectively inputting to said first one bit storage element either (a) said first (logic) input or (b) the output of (one of) said second one bit storage element(s); (vi) optionally (FIG. 2 bottom) a second switching element (70) (per second one bit clocked storage element) for selectively inputting to said second one bit storage element either (a) said second (value) input (55) or (b) the output (80) of said first one bit storage element and (vii) a first control system (90) (circuit and/or processor and/or controller) for providing steering signals for said switching elements and providing clock signals to said one bit clocked storage elements.

In an embodiment of the invention the one or more of said one bit clocked storage elements are flip flops.

In an embodiment of the invention one or more of said switching elements being a (two-input) multiplexer (or in case of multiple (see FIG. 3) second one bit clocked storage elements (30), (110), the first switching element (60) has as many inputs as the amount of such storage elements plus 1).

As shown in FIG. 5, the invention provides a system or matrix (200), comprising a plurality of said circuits (20) as described above; and a plurality of programmable logic units (210) (look-up tables and other logic functions (SPU's, . . . )) arranged by use of multiplexers and (configuration) storage), wherein a plurality of said first one bit clocked storage elements and said programmable logic units are arranged in an array (to operate together as programmable logic), in particular the output of some of said programmable units serve as said first (logic) input for some of said first one bit clocked storage elements and the output of some of said first one bit clocked storage elements serves as logic input for some of said programmable units.

In an embodiment the plurality of said second one bit clocked storage elements are arranged in series (to define and operate as a shift register), in particular the output of one second one bit clocked storage elements serve as said second (data) input for the next second one bit clocked storage element in the series (to establish data communication via said inputs (50) and outputs (150)).

In a further embodiment of the system a plurality of said shift registers arrangements are arranged in parallel.

Figure 4:
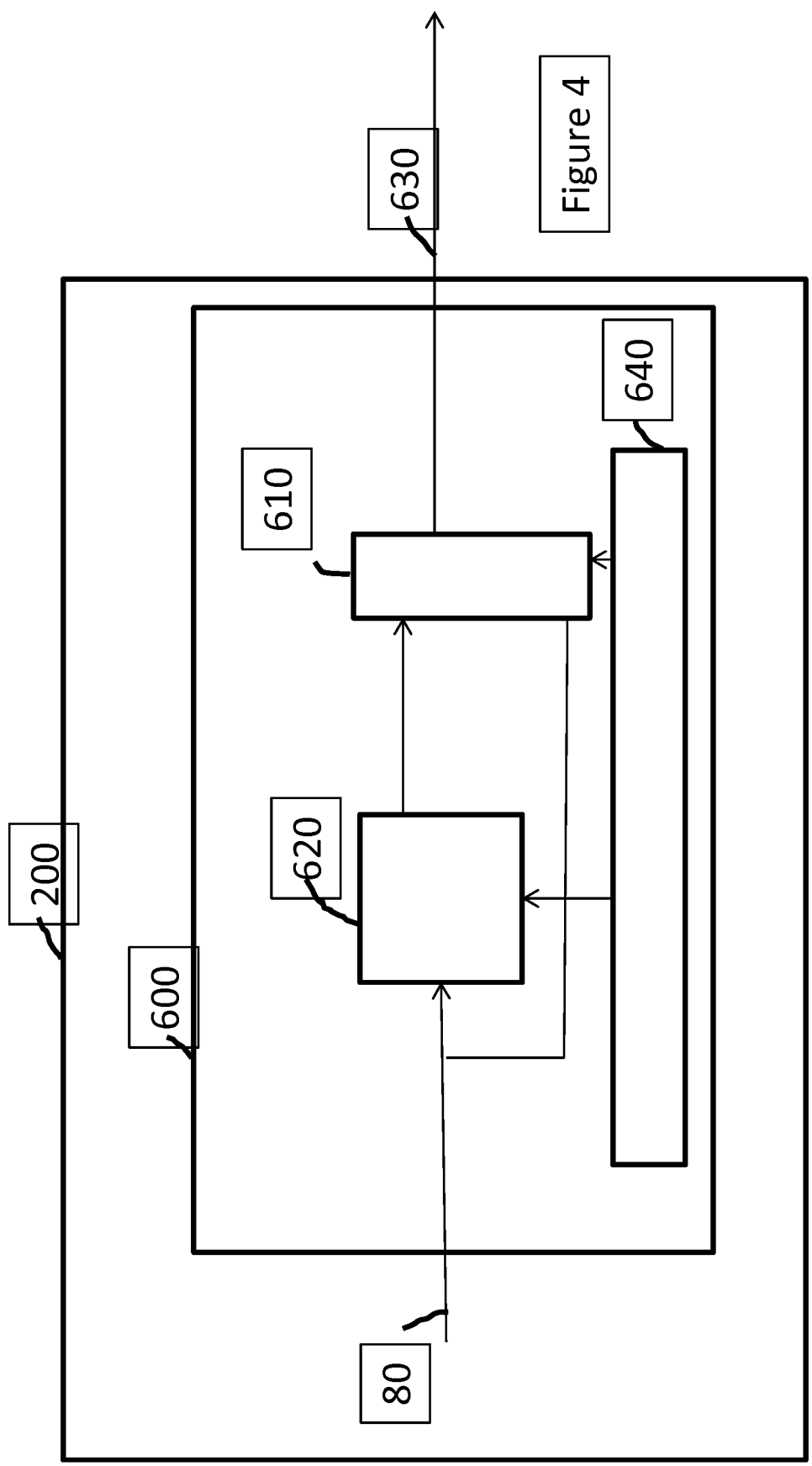
FIG. 4 illustrates schematically a specific output circuit.

FIG. 4 shows a particular output circuit (600), required to ensure safe operation in case of task switching.

Hence preferably, the system has one or more of output ports (630), provided with such output circuit (600), said system further comprising (for each of said output ports a subsystem (600)): (i) a third one bit clocked storage element (620); (ii) a third switching element (610) for selectively providing to said output port either (a) an output (80) of one of said first one bit clocked storage elements or (b) the output of said third one bit storage element; wherein a second control system (640) (circuit and/or processor and/or controller) provides steering signals for said third switching element(s) and providing a clock signal to said third one bit clocked storage element(s).

In an embodiment of the invention said third one bit clocked storage element(s) are flip flops.

In an embodiment of the invention said third switching elements are (two-input) multiplexer.

The system hence comprises of an overall control system for providing steering signals for said switching elements and providing clock signals to said one bit clocked storage elements (said overall control system either defining said first and/or second control systems or said overall control system comprising of said control systems or said an overall control system being partitioned whereby said partitions are defining said first and/or second control systems).

As shown in FIGS. 1 and 5, the invention provides arrangement (300), comprising (i) a matrix (200) with (a) a plurality of programmable logic units (210) (configurable look-up table and multiplexer arrangements) and (b) a plurality of first one bit clocked storage elements (20), said programmable logic units and first one bit clocked storage elements being arranged in an array (to operate together as programmable logic), whereby for each of said first one bit clocked storage elements a data store and restore circuit (220, without 20) is provided, (ii) a control system (230) for controlling said system, in particular said data store and restore circuit, (iii) a data memory (310), said control system (circuit and/or processor and/or controller) comprising input means for receiving instructions and circuitry, acting in accordance with said received instructions, being capable to generate signals for said system, to (i) store data of said of first one bit clocked storage elements; or (ii) (pre-)load data from said memory into said data and restore circuit, (iii) load data into said first one bit clocked storage elements or (iv) to store data currently in said data store and restore circuit to said memory.

In an embodiment, said data store and restore circuit is arranged (i) to store data of said of first one bit clocked storage elements; or (ii) load data into said first one bit clocked storage elements in 1 clock cycle.

In an embodiment of the invention the data store and restore circuit comprises (i) at least one second one bit clocked storage element, (iii) a first (logic) input (connected via said first storage element to a logic unit), (iv) optionally a second (value) input, (v) a first switching element for selectively inputting to said first one bit storage element either (a) said first (logic) input or (b) the output of (one of) said second one bit storage element(s); (vi) optionally a second switching element (per second one bit clocked storage element) for selectively inputting to said second one bit storage element either (a) said second (value) input or (b) the output of said first one bit storage element and (b) said control system is adapted for providing steering signals for said switching elements and providing clock signals to said one bit clocked storage elements.

In an embodiment of the invention said one or more of said one bit clocked storage elements are flip flops.

In an embodiment of the invention said one or more of said switching elements are (two-input) multiplexers or in case of multiple second one bit clocked storage elements, the first switching element has as many inputs as the amount of such storage elements plus 1.

In a preferred embodiment in the arrangement the plurality of said data store and restore circuits are arranged in series (to define and operate as a shift register).

In a preferred embodiment in the arrangement a plurality of said second one bit clocked storage elements are arranged in series (to define and operate as a shift register), in particular the output of one second one bit clocked storage elements serve as said second (data) input for the next second one bit clocked storage element in the series.

In a further preferred embodiment in the arrangement the memory and a plurality of said data store and restore circuits and/or shift registers are arranged to enable parallelization of said pre-load and memory store operations.

While above the invention was described either (in FIG. 2) as a circuit level description including the first storage element (which is part of the original matrix) or alternatively at system or arrangement level (in FIG. 5) said first storage elements accompanied with a data store and restore circuit, also the combined circuit can be considered.

Hence the invention also provides a circuit comprising (i) a first one bit clocked storage element; (ii) a first (logic) input and (iii) a data store and restore circuit comprising (a) at least one second one bit clocked storage element, (b) a first switching element for selectively inputting to said first one bit storage element either (1) said first (logic) input or (2) the output of (one of) said second one bit storage element(s); and (c) a first control system (circuit and/or processor and/or controller) for providing steering signals for said switching elements and providing clock signals to said one bit clocked storage elements.

The data store and restore circuit is adapted for fetching or storing externally data, said data store and restore circuit further comprising (d) a second (value) input; and (e) a second switching element (per second one bit clocked storage element) for selectively inputting to said second one bit storage element either (1) said second (value) input or (2) the output of said first one bit storage element The one or more of said one bit clocked storage element are typically a flip flops.

The one or more of said switching elements are a (two-input) multiplexers (or in case of multiple second one bit clocked storage elements, the first switching element has as many inputs as the amount of such storage elements plus 1).

It is worth emphasizing the dual function of said data store and restore circuit, being data transfer from and to said first storage element and data transfer from and to said memory, with separate considerations in terms of cycles required to be considered.

Hence the invention provides for an arrangement, comprising (i) a system with (a) a plurality of programmable logic units (configurable look-up table and multiplexer arrangements) and (b) a plurality of first one bit clocked storage elements, said programmable logic units and first one bit clocked storage elements being arranged in an array (to operate together as programmable logic), the arrangement being adapted for sequentially execution of at least two tasks, whereby for each of said first one bit clocked storage elements a data store and restore circuit is provided for local storing or restoring the respective values per task of said first one bit clocked storage elements.

The arrangement comprises an overall control system for generating instructions or signals for said a data store and restore circuit in accordance with the safe switching of the execution of said tasks.

In a preferred embodiment the arrangement has said data store and restore being arranged in that said storing or restoring is performed in 1 clock cycle.

In a preferred embodiment the arrangement further comprises a memory, external to said system, wherein said data store and restore circuit is provided for (i) pre-loading data/values related to one task from said memory into said data and restore circuit and/or (ii) post-storing of data/values related to one task in said data store and restore circuit to said memory, whereby said pre-loading and/or post-storing can be performed while another task is executed without disturbing said task execution.

Description of the Second Aspect of the Invention Related to the Configuration Part The invention is now further detailed with respect to the first aspect of the invention related to the data.

The invention provides a circuit (with an first output (735) and an second output (715)) comprising (i) a first one bit clocked storage element (710) (who's output serves as output (715)); (ii) a first input (705) for said first one bit clocked storage element, (iii) at least one second one bit clocked storage element (720) (who's output may serve as output (735) directly (FIG. 6 top) or indirectly (FIG. 6 bottom)), connected (directly (FIG. 6) or indirectly (FIG. 7) to said first one bit clocked storage element, (iv) a control system (730) (circuit and/or processor and/or controller) for providing clock signals to said one bit clocked storage elements.

In an embodiment of the invention the one or more of said one bit clocked storage element are or comprise of latches suitable for storing configuration bits for a programmable logic.

In an embodiment of the invention (FIG. 7) the circuit further comprises (v) further second one bit clocked storage elements (750); and (vi) a switching element (760) for selectively inputting the output of said one bit clocked storage element (710), (720) or (750) as output (735).

In an embodiment of the invention said switching element is a (two-input) de-multiplexer (or in case of multiple second one bit clocked storage elements, the switching element has as many outputs as the amount of such storage elements.

The second aspect of the invention provides (as shown in FIG. 8) at system level hence a system (800), comprising a plurality of said circuits (700) as discussed above; and a plurality of programmable logic units (210), wherein a plurality of said circuits and said programmable logic units are arranged in an array (to operate together as programmable logic), in particular the output of said second one bit storage elements (or optionally said first one bit storage element) serves as configuration bit for said programmable units. Note that the dashed lines indicate the matrix aspect.

In an preferred embodiment of the invention a plurality of said first one bit clocked storage elements are arranged in series (to enabling shifting information from one to another), in particular the output of one first one bit clocked storage elements serve as said first input for the next first one bit clocked storage element in the series.

In a further preferred embodiment a plurality of said series connected circuits are arranged in parallel.

The system above comprises an overall control system providing clock signals to said one bit clocked storage elements (and where application for providing steering signals for said switching elements) (said overall control system either defining said control systems or said overall control system comprising of said control systems or said an overall control system being partitioned whereby said partitions are defining said control systems).

Finally the invention provides hence an arrangement, comprising (i) a system with (a) a plurality of programmable logic units (configurable look-up table and multiplexer arrangements), being arranged in an array (to operate together as programmable logic), whereby for each of said programmable logic unit, a configuration bit storage circuit is provided, (ii) a control system for controlling said system, in particular said configuration bit storage circuit, (iii) a memory, said control system (circuit and/or processor and/or controller) comprising input means for receiving instructions and circuitry, acting in accordance with said received instructions, being capable to generate clock signals for said system, to (i) store a configuration bit in said first one bit clocked storage element from said memory; or (ii) load a configuration bit from said first one bit clocked storage element into a (or one of said) second one bit clocked storage element(s).

In an embodiment said configuration bit storage circuit is arranged to load a configuration bit from said first one bit clocked storage element into a (or one of said) second one bit clocked storage element(s) in 1 clock cycle.

In an embodiment of the invention (a) the configuration bit storage circuit comprising (i) a first one bit clocked storage element; (ii) a first input for said first one bit clocked storage element, (iii) at least one second one bit clocked storage element, connected (directly or indirectly) to said first one bit clocked storage element, (iv) a control system (circuit and/or processor and/or controller) for providing clock signals to said one bit clocked storage elements.

In an embodiment one or more of said one bit clocked storage element are flip flops.

In an embodiment the plurality of said configuration bit storage circuits are arranged in series (to transfer configurations from one to another)). In an embodiment of the invention the techniques as described in US 2015/0091613 (U.S. Ser. No. 14/153,760) are used.

In an embodiment as said the plurality of said first one bit clocked storage elements are arranged in series, in particular the output of one first one bit clocked storage elements serve as said first input for the next first one bit clocked storage element in the series.

In an embodiment the arrangement is arranged in that the memory and a plurality of said configuration bit storage circuits are arranged to enable parallelization of said store operations.

DESCRIPTION OF THE COMBINATION OF THE ASPECTS OF THE INVENTION

As said as the invention contributes a solution for use of flexible logic units, being adapted for sequentially execution of at least two tasks, while still be suitable for real-time use, both the data aspect (data as computed during said tasks) as the configuration aspect (the configuration of the programmable elements in the logic) have to be and are addressed by the invented circuits, system and arrangement described above.

It is worth emphasizing at this stage that the amount of circuit duplication remains limited as only the storage elements and a few additional (switching circuits) and control must be added without a need to duplicate anything else of the logic unit.

It is also notable that, while the low—up to 1 clock cycle aspect boils locally down to a circuit level connection of storage elements, that the preserving of smart communication both at data and configuration level to the memory outside the matrix requires sufficient input/output to ensure the series connection required for that.

Let us also stress that various alternative embodiments are covered, for instance providing more than one storage place for data and configuration, but also embodiments with less circuit needs, e.g. no loading or storing of data back and forth with memory. Obviously combinations of those can be made and have consequences on the method to be deployed in the arrangement.

To avoid confusion the arrangement is again described below with all (renumbered) elements.

The invention provides for an arrangement, comprising (i) a system with (a) a plurality of programmable logic units (configurable look-up table and multiplexer arrangements) and (b) a plurality of first one bit clocked storage elements, said programmable logic units and first one bit clocked storage elements being arranged in an array (to operate together as programmable logic), the arrangement being adapted for sequentially execution of at least two tasks, whereby for each of said first one bit clocked storage elements a data store and restore circuit is provided for local storing or restoring the respective values per task of said first one bit clocked storage elements; and hence an overall control system is provided (circuit and/or processor and/or controller) for generating instructions or signals for said data store and restore circuit in accordance with the safe switching of the execution of said tasks.

In a preferred embodiment the arrangement of any of the previous concepts, further comprising a data memory, external to said system, wherein said data store and restore circuit is provided for (i) pre-loading data/values related to one task from said memory into said data and restore circuit and/or (ii) post-storing of data/values related to one task in said data store and restore circuit to said data memory, whereby said pre-loading and/or post-storing can be performed while another task is executed without disturbing said task execution.

The arrangement further comprising a configuration bit memory whereby for each of said programmable logic unit, a configuration bit storage circuit is provided, wherein said configuration bit storage circuits, each comprising (i) a fourth one bit clocked storage element; (ii) a first input for said fourth one bit clocked storage element, (iii) at least one fifth one bit clocked storage element, connected (directly or indirectly) to said fourth one bit clocked storage element; and wherein said overall control system is further provided for controlling said configuration bit storage circuit; and said overall control system comprising input means for receiving instructions and circuitry, acting in accordance with said received instructions, being capable to further generate clock signals for said configuration bit circuit to (i) store a configuration bit in said fourth one bit clocked storage element from said memory; or (ii) load a configuration bit from said fourth one bit clocked storage element into a (or one of said) fifth one bit clocked storage element(s).

Alternatively said a flexible logic unit is provided at configuration level, being adapted for sequentially execution of at least two tasks, comprising: a matrix having a plurality of tiles arranged in columns and rows, each tile having at least one first storage element therein, and at least one second storage element therein connected (directly or indirectly) to one first storage element, each tile having configurable logic configurable responsive to configuration data stored in the respective second storage element, a control interface to accept at least a configuration word for a storage element, the interface configured to generate said configuration data from the configuration words, preferably said first and/or second storage elements are latch banks.

In an embodiment of the invention the flexible logic unit being such that the configurable logic comprises at least one field programmable gate array coupled to the plurality of said second storage elements (latch banks) to be configured by configuration data therein.

In a preferred embodiment the flexible logic unit being arranged such that each of the first storage elements (latch banks) being arranged to accept configuration data from an immediately previous first storage element (latch bank) in that column.

The flexible logic unit further being adapted at data level, wherein configurable logic and third one bit clocked storage elements being arranged in an array (to operate together as programmable logic), wherein at least one fourth one bit clocked storage element being provided for each third one bit clocked storage elements for local storing or restoring the respective values per task of said third one bit clocked storage elements, wherein preferably wherein one or more of said fourth or fifth one bit clocked storage element being a flip flop.

In a preferred embodiment a plurality of said fourth one bit clocked storage elements are arranged in series, in particular the output of one fourth one bit clocked storage elements serve as said first input for the next fourth one bit clocked storage element in the series.

Further Embodiments of the Invention

Configuration Bits Aspect

FIGS. 10 and 11 provide a double latch structure with the addition of a context switch controller apparatus. The elements are:
1) This represents one configuration bit of the eFPGA matrix. There are multiple of those elements connected together as a chain so that configuration data can be shifted in.
2) One of the 2 latches is the one that actually configures the FPGA matrix. This one is not in the daisy chain and receives the configuration bit from pre-load latch (4) when decided by the FLU context controller.
3) The configuration latch bit is used by eFPGA matrix.
4) The second latch is the pre-load latch. In normal context switching operation mode, it does not directly configure anything inside the FPGA matrix. Therefore, its value can be changed at any time. Even if a task is under execution inside FLU matrix. In optimized "ping-pong" context switching operation mode (see further), it can be selected as FLU matrix configuration based on multiplexer (7) selection.
5) This is the configuration bitstream loading daisy chain. The configuration bits are shifted-in one by one under control of the FLU configuration controller (6)

As introduced above, preferably all double-latch elements are chained together so that the FLU context controller can serially enter the configuration data into it.

In addition, depending on FLU matrix topology, the configuration chain can be split in multiple chunks to allow bit stream loading parallelization for loading time minimization.

Figure 14:
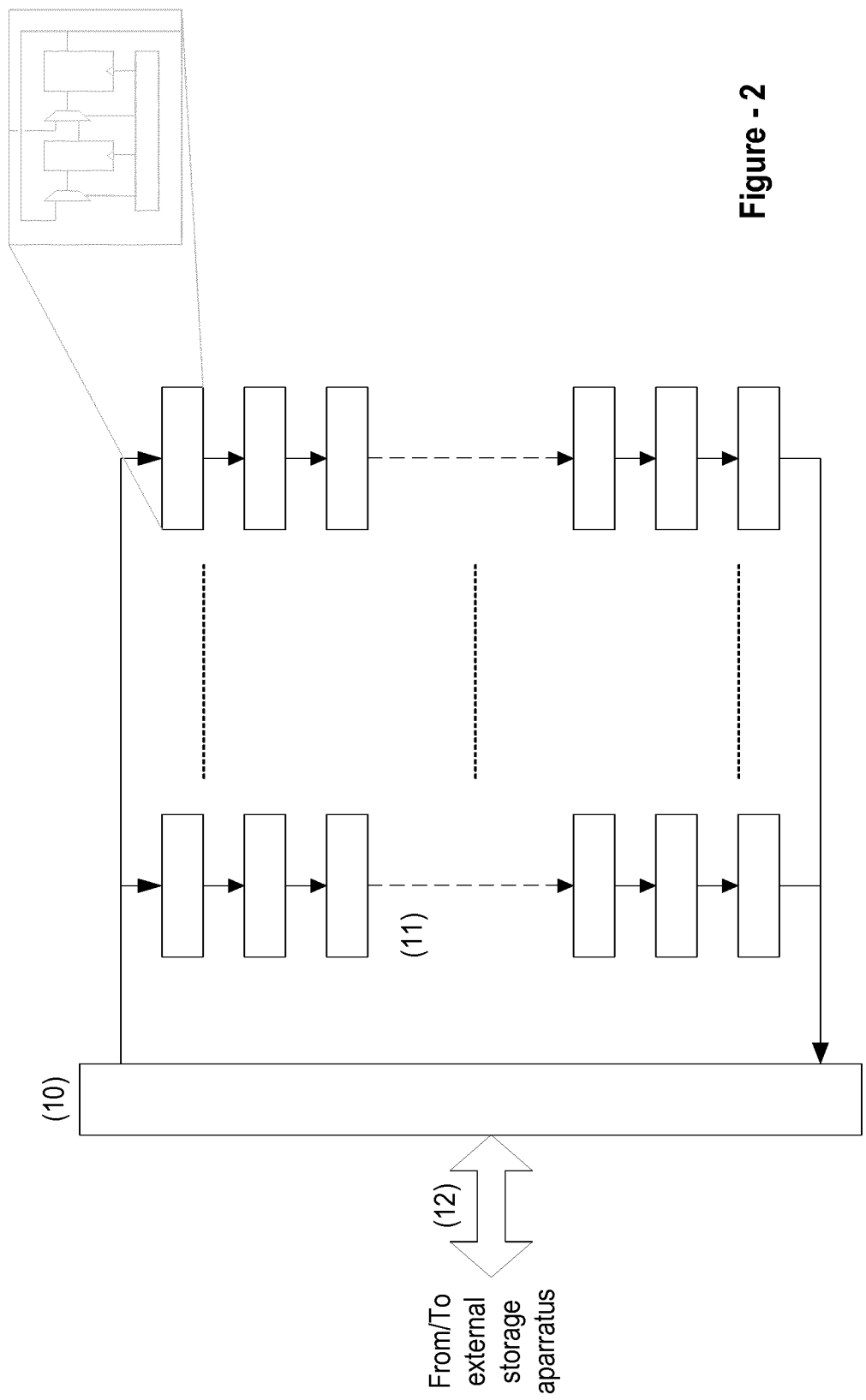
FIG. 14 described an arrangement in accordance with the invention.

As shown in FIG. 14 the bit stream data is typically fetched but the FLU context controller (10) from an on-chip non-volatile memory (12); and appropriately fed into the configuration chains.

Data Aspect

The invention provides for data storage a double flop element.

The embedded eFPGA typically features many flip-flop elements dedicated to FLU mapped task algorithm data storage. In a context time slice context switching in eFPGA it is important that the value of those elements is saved to an external storage apparatus before context switch and restored when the task is reloaded and resumed in FLU matrix.

Figure 13:
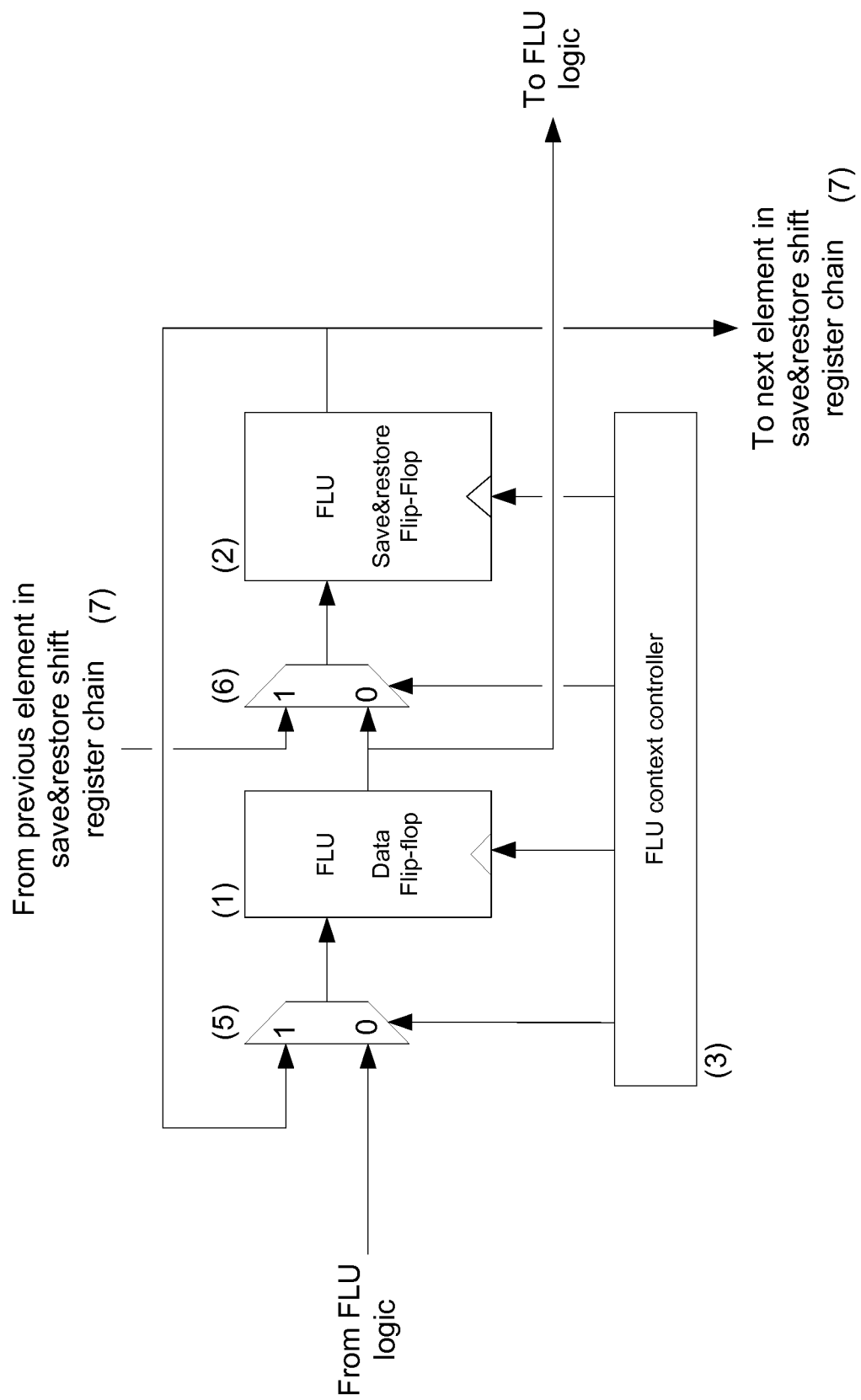
FIG. 13 describes a circuit in accordance with the embodiment of FIG. 2 bottom.

A mechanism of double-flop is implemented as shown in FIG. 13:
1) This is the "operating" flip-flop. When the FLU matrix in currently executing a given task, this flip-flop is used by this task for its own algorithm purpose. The "operating" state is selected when the flip-flop input multiplexer (5) select the '0' line and when the FLU context controller (3) provides a steady clock to this flip-flop.
2) This is the save&restore flip-flop. This one cannot be used by the FLU mapped operating task. Therefore, its value can be changed at any time during operation without functional impact on application.
This flip-flop is connected as a shift register with identical flops from/to other double-flop structures of the FLU matrix (7). This flip-flop operates in three modes depending on FLU context controller (3) orders:

a. Shift-in mode: In this case, the load multiplexer (6) selects the line '1' and the flip-flop (1) is in "operating" mode. Then the controller generates as many clock pulses of flip-flop (2) as number of double-flop elements in the chain. In parallel, the controller fetches the context data from a volatile memory (SRAM, DRAM, . . . ) outside the FLU. Then the controller synchronously feeds the daisy chain with this data so that at the end of the shift-in sequence, all the context data is pre-loaded in the save&restore flip-flops (2)

b. Switch mode: In this mode, the load multiplexer (6) selected the line '0' and the operating multiplexer (5) selects the line '1'. Then the controller generates a single clock cycle. This clock pulse simultaneously transfers the data from flop (1) to flop (2) and the other way round.

c. Switch-out mode: this mode is identical to shift-in mode from dual-flop element point of view. The difference is in the controller that now gets the data out from the chains and transfers it to the volatile memory.

Please note that shift-in and shift-out modes can be executed simultaneously by the context controller. It is perfectly possible to shift-in restore data while shift-out saved data.

FIG. 14 shows how the double-flop elements are organized in chains in the FLU matrix. Depending on FLU matrix topology, the chain is split in multiple chunks to minimize shift-in out operations delay.

Output Port Aspect

When switching from one task to another one in FLU matrix, we have to solve potential issues with regard to how the tasks interact with the rest of the FPCU.

Input port does not cause any problem

However, for output ports we have to consider different situations:

During task switching clock cycle, we have to insure that all output port are frozen to avoid potential corrupted intermediate values to be exported outside the FLU.

If an output port is not used by the new task, we have to consider that it has been previously used by another task before switching. And, this other task may be re-loaded sometime in the future. SO, the output port value must be kept stable so that the FLU outside is not impacted.

If an output port is used by the new task, then the logic value of the port is driven from within the FLU matrix.

Figure 15:
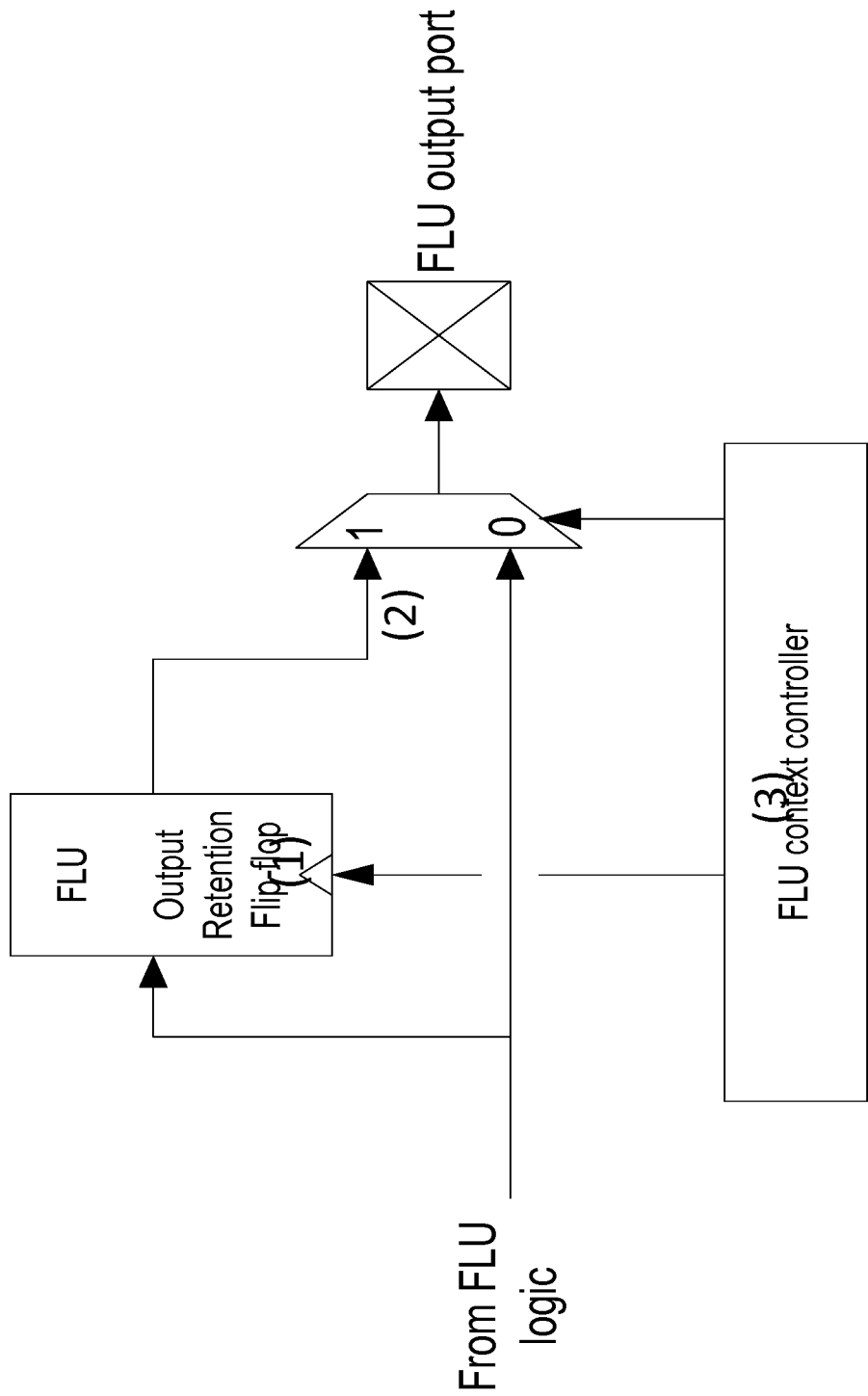
FIG. 15 describes a circuit in accordance with the embodiment of FIG. 4.
Figure 16:
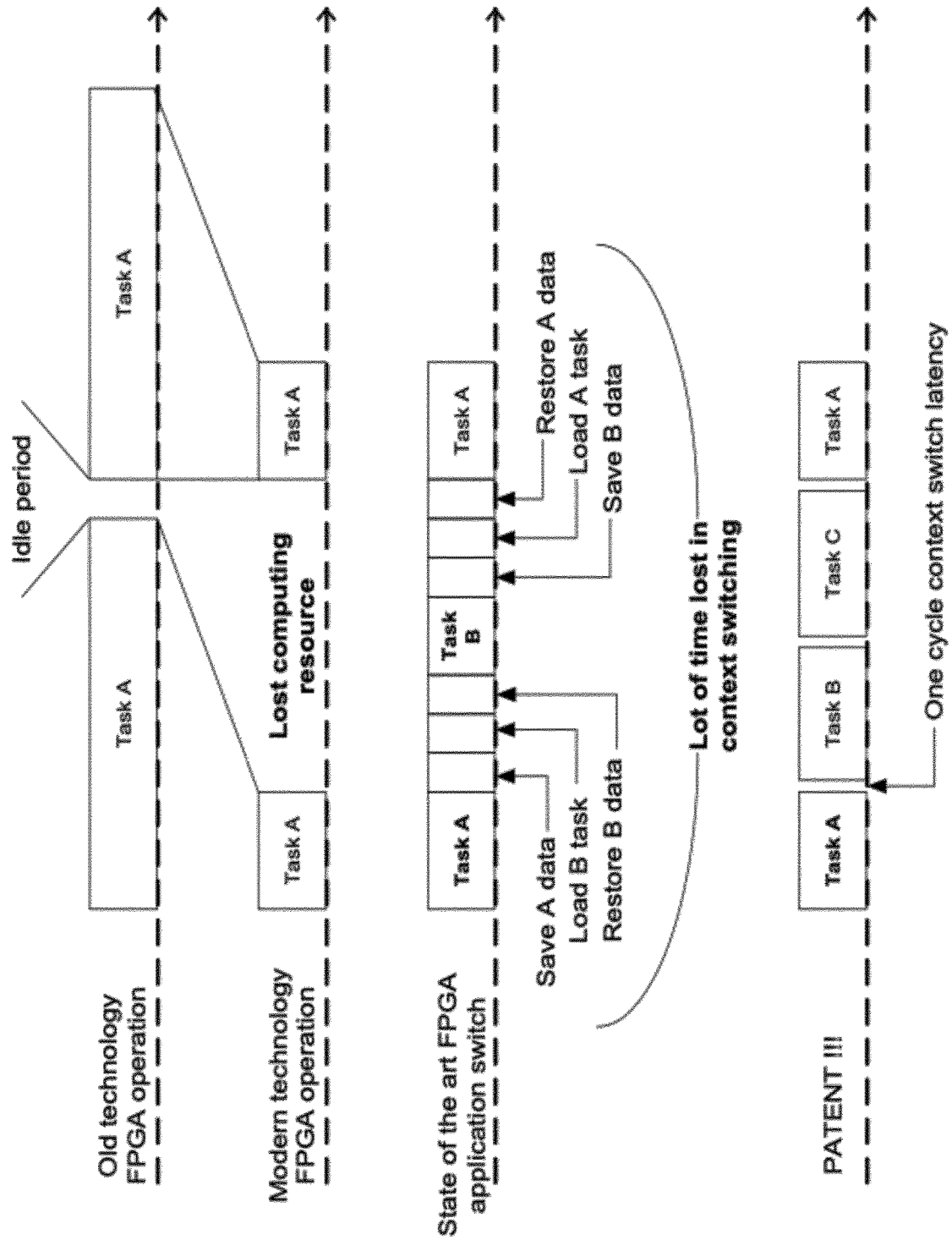
FIG. 16 illustrates the sequential execution of tasks targeted by the invention.

FIG. 15 explains a technical solution to those scenarios.

Context Switching Methods in Accordance with the Invention

The above solutions do not make any assumption on the reasons why and the time when a FLU context switching must be executed. If we keep the consistency with what happens in real-time operating systems, there should be a hypervisor module that would decide for the switching based on real-time constraints. This can be an embedded software decision or that can be part of the FLU mapped application itself or that can be a hard coded state machine as well.

Figure 17:
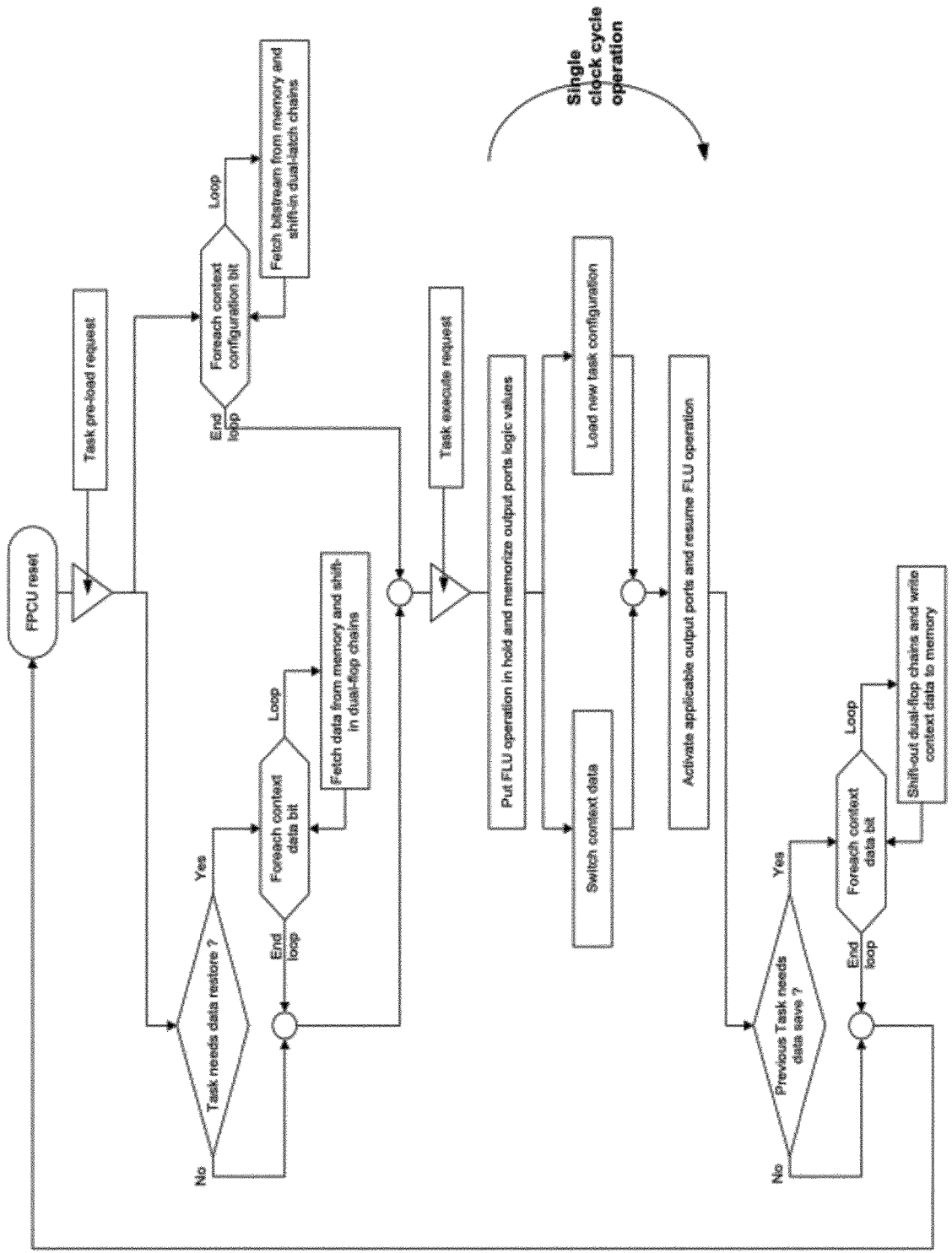
FIG. 17 described a flow chart of the controllers as required by the invention.

FIG. 17 describes the high level algorithm that should be handled by the FLU context controller as soon as it receives a context switch request. This sequence can be split in three main phases:

1) Once the FLU context controller receives the next task pre-load order, it initiates two parallel actions:

a. If the next task needs data context restore, then the appropriate data is retrieved from memory and shifted in double-flop chains.

b. The next task configuration bitstream is fetched from flash and shifted-in double-latch elements.

2) The controller now waits until it received the request for effective task switching. Then in one clock cycle, it stops the FLU operation (i.e. freezes the state of the previously running task) and simultaneously switches the double-flop contents and transfer configuration bits to configuration latches.

3) Finally, if needed, the data context of the previously running task is shifted-out of the double-flop chains and saved in memory.

Figure 18:
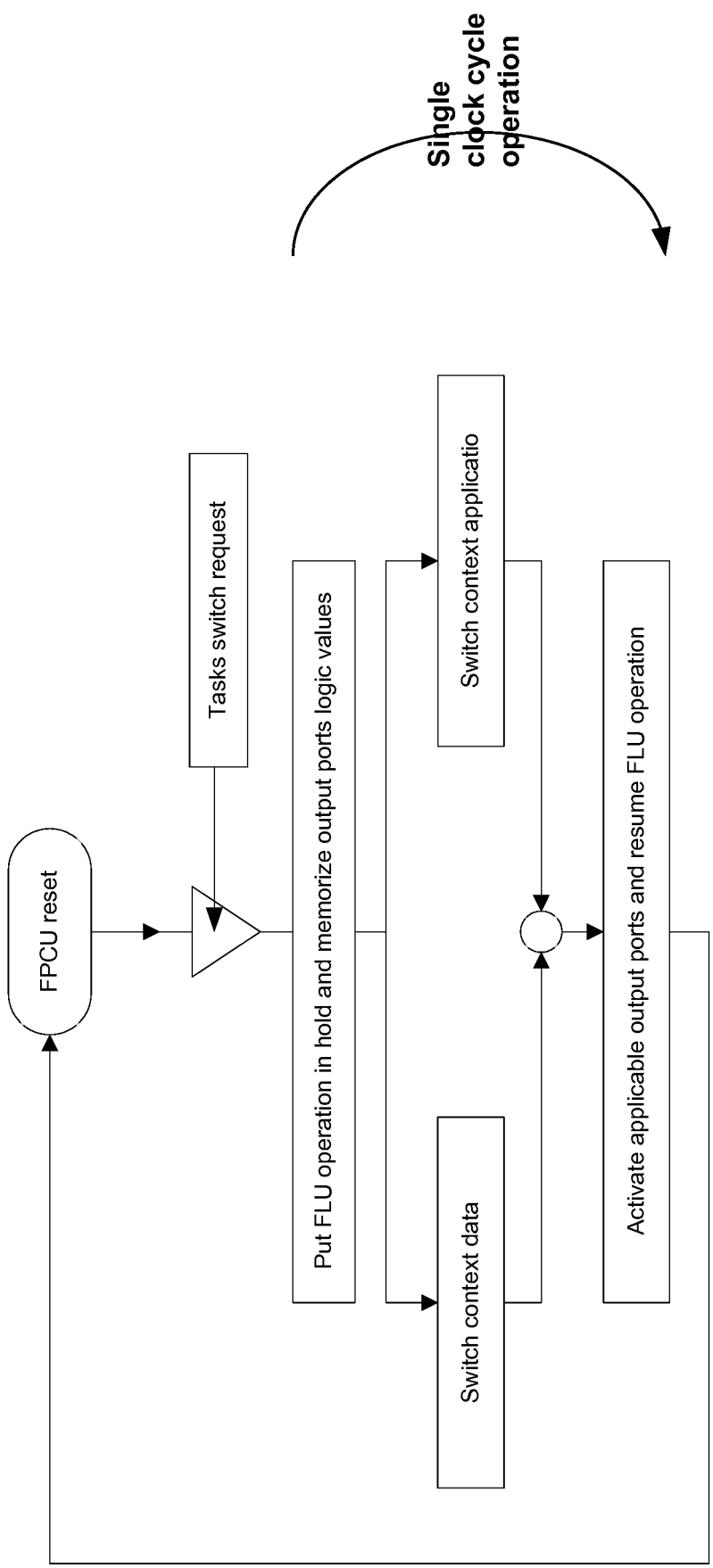
FIG. 18 described a particular flow chart of the controllers as required by the invention.

Note that in case of ping-pong mode, this algorithm can be simplified as shown in FIG. 18 (this algorithm assumes that the pre-load and configuration latches have been previously filled with respectively one of the two applications to be switched in ping-pong mode).

In the generic case, the FLU matrix can switch between multiple tasks. There is no theoretical limitation in the mechanism. In reality some limitations shall appear because:

The following sequence requires that the tasks activity duration is long enough to mask shift-in/out delays. If the tasks are too short, then the mechanism still works, but at the cost of some switching latency impact.

The more different task we have, the more non-volatile memory size increases.

The more different task we have, the more data context save&restore memory size increases.

Figure 19:
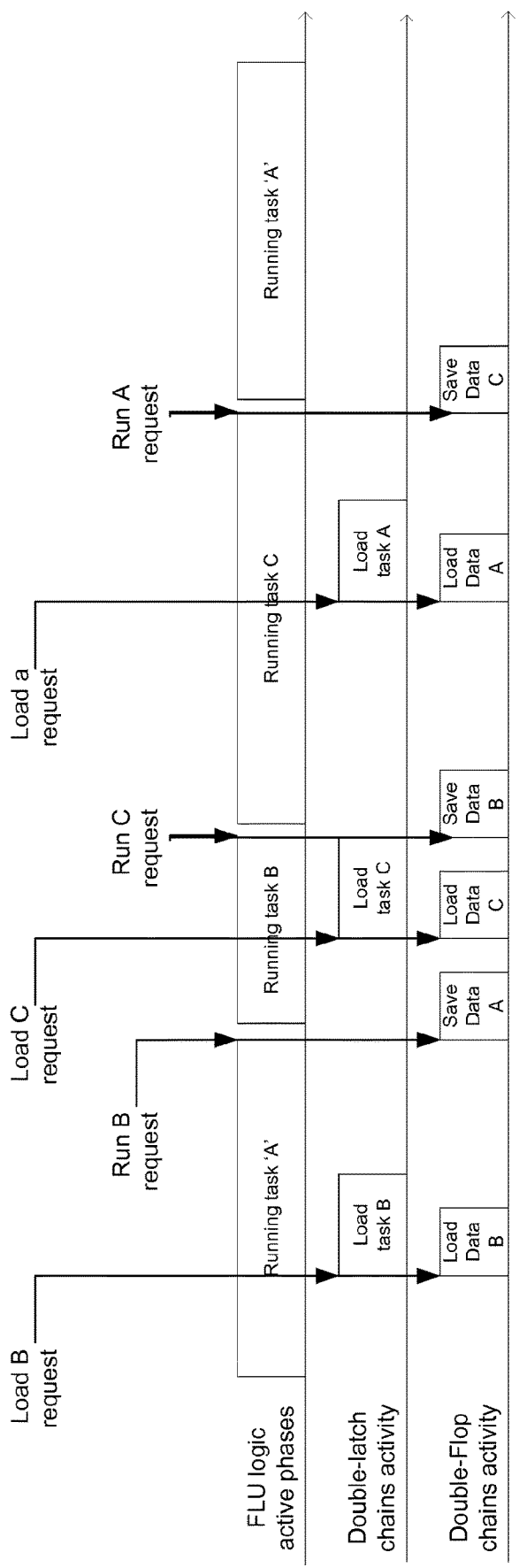
FIG. 19 provides a further detail of the sequential execution of the tasks as required by the invention.
Figure 20:
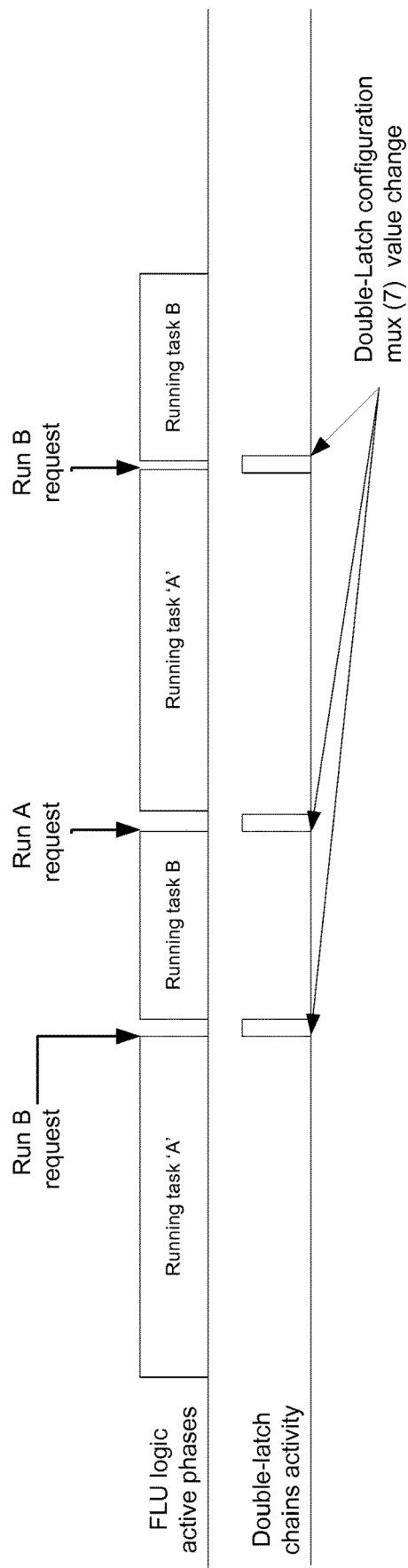
FIG. 20 provides a specific further detail of the sequential execution of the tasks as required by the invention.

FIG. 19 explains the situation, where 3 tasks are iteratively running on the FLU:

FIG. 20 described the case where only two tasks are successively alternated on the FLU, the previous sequence can be optimized because there is no need for context configuration and data shift in/out in this case.

Additional Embodiment in Relation to Flu Configuration Fault Tolerance

There is an additional benefit related to functional safety of the FLU. This is important because of the target market of FPCU component (automotive) in the context of ISO26262 safety standard.

The benefit comes from the following technical assessment.

If we consider the characteristics of a "Latch" logic element, we can conclude that the element reaches the highest fault tolerance when put in specifics operating conditions:

The latch clock is maintained inactive

The logic level of the input (DF) and output (Q) of the latch are identical.

The following table gives the safe fault fraction, indicating the fault tolerance of a latch element in 55 nm CMOS technology. The higher the safe fault fraction is, the best is the fault tolerance. Those conclusions can be transposed to others CMOS technologies with similar results:

| D | Q | Safe fault fraction |
|---|---|---|
| 0 | 0 | 96.29% |
| 0 | 1 | 75.58% |
| 1 | 0 | 69.40% |
| 1 | 1 | 91.65% |

The first condition is implicit in our context because, when the FLU matrix is configured for a certain task, then the configuration latches values are frozen. Therefore, their clocks are maintained inactive by the FLU context controller.

The second condition can be easily guaranteed because of the double-latch structure. Indeed, after context switch execution, the two latches in the element have the sale logic level. Therefore, the latch (2) is maintained in safe condition.

Figure 21:
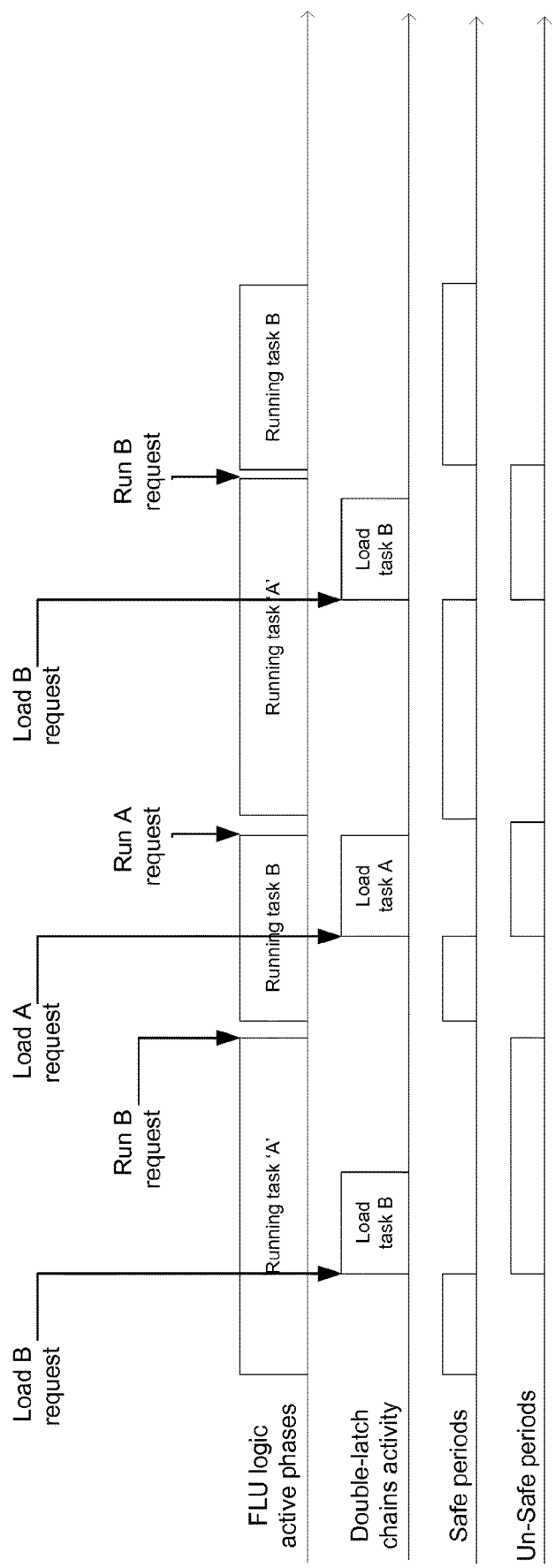
FIG. 21 illustrates a particular consideration in relation to fault tolerance.
Figure 22:
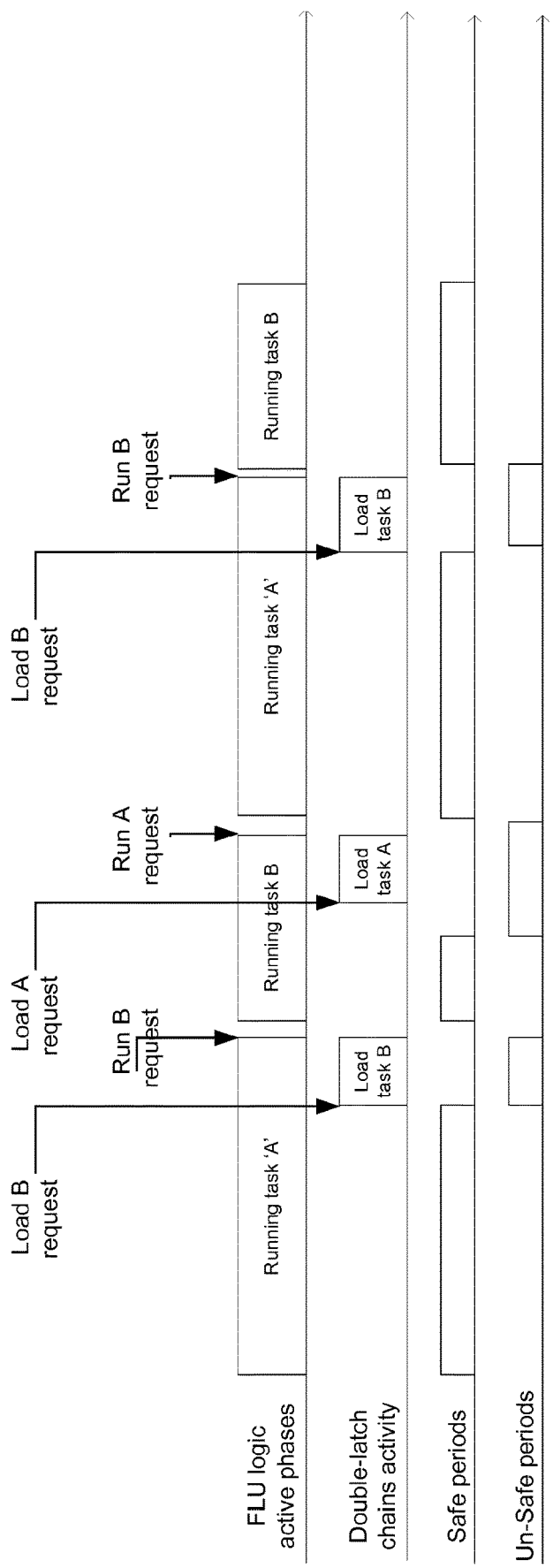
FIG. 22 provides a specific further detail of the sequential task execution addressing this consideration.
Figure 23:
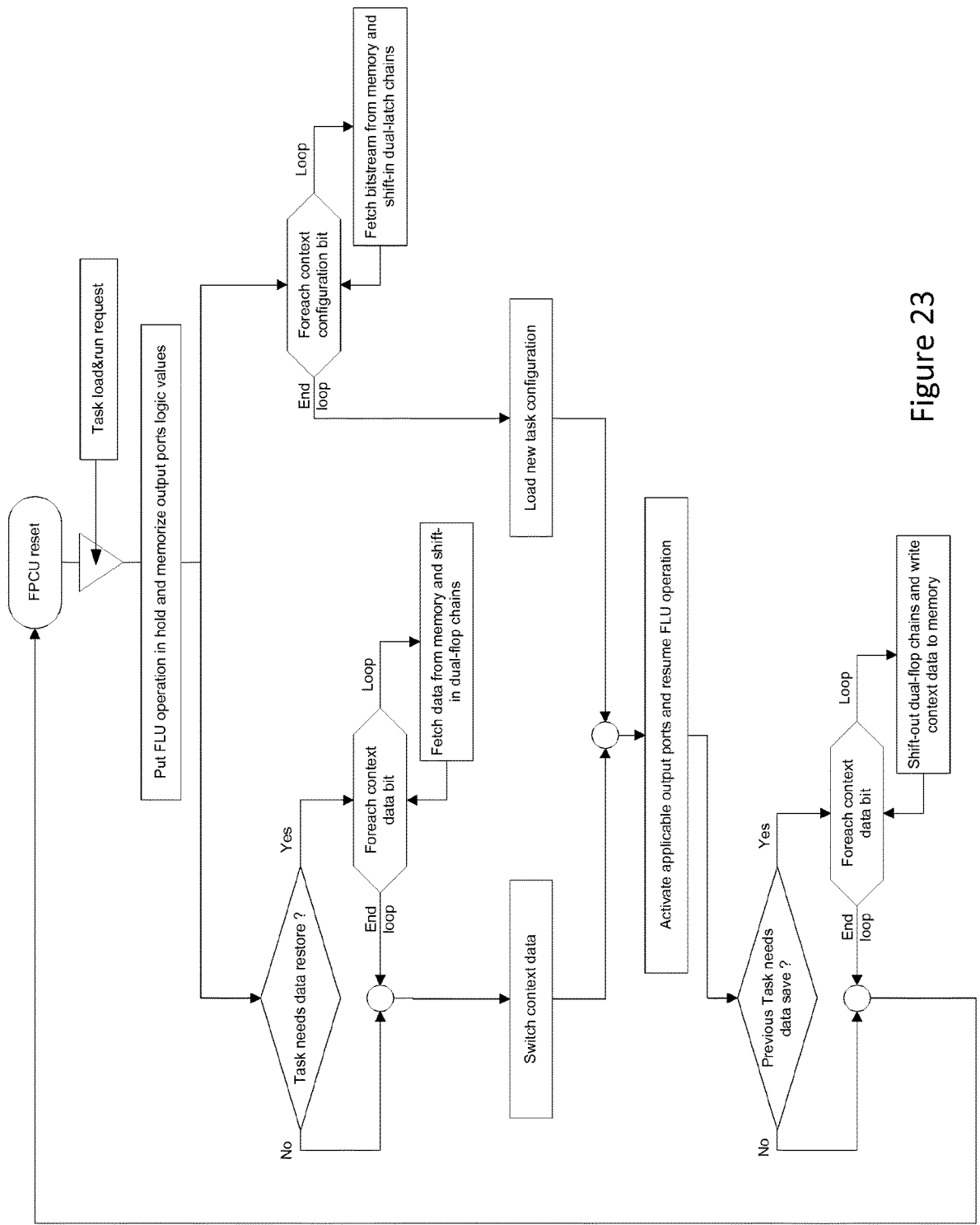
FIG. 23 described a particular flow chart of the controllers as required by the invention also addressing this consideration.

However, if we keep the generic algorithm defined above the safe state cannot be guaranteed during the complete periods of FLU tasks executions. Therefore the functional safety level is lower than expected. FIG. 21 give an example of this:

A first level of containment of this problem does not require the re-definition of the control algorithm. It is a just a matter of having the load and run requests being triggered as late as possible during task execution. This strategy maximizes the safe periods without any impact on processing efficiency. That can be a good trade-off if the task execution periods are much longer that task load delays. FIG. 22 illustrate this strategy:

A second level of containment consists in using the FLU context control algorithm as FIG. 23.

Figure 24:
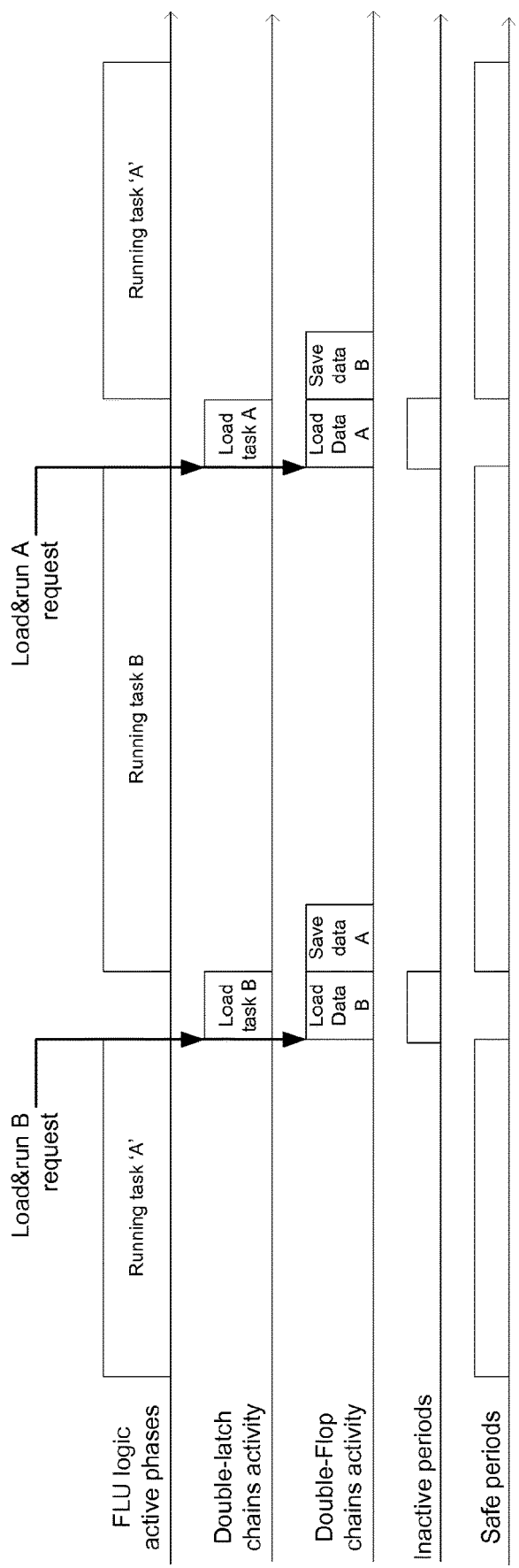
FIG. 24 illustrates the sequential execution as realized by the method of FIG. 23.

FIG. 24 illustrates the benefit of this strategy. It guarantees that all the tasks are 100% executed in the safe conditions. This strategy has a cost in terms of performance because of the inactive phases.

FLU Low Power Use-Case

In a particular embodiment of the invention a FLU low power use-case is provided. We can compare this feature with what already exist for CPU cores (in mobile processor in particular). On those processors, when the CPU has no task pending, then the OS may decide to put the CPU cores in low-power state (this is referred to as "idle management" in Linux kernel). There may be different level of low power state depending on the capability of the hardware. The OS will choose amongst all the available levels depending on application criteria.

CPU clock frequency change
CPU clock stop
CPU core power switch-off with cache memories retention
CPU+cache core power-off
. . .

The invention provides the same kind of "idle management" for our FLU in that the invention provides context save/restore mechanisms and circuits enabling this.

When a FLU algorithm is "idle", then it can enter a "low power" state.
The FLU context save/restore mechanism allows to have deep low-power state (with FLU power switched-off)
During this mode, the power consumption of the FLU matrix is null.

Time-Sliced and Compare

The invention provides a functional safety solution called time-sliced and compare approach. It is a particular implementation of a lock-step mechanism using our FLU context switch.

Background: lock-step
In a state-of-art "lock-step" architecture. The same logic function (CPU, DMA, whatever . . . ) is duplicated on silicon.
Then, both parallel instances receive the exact same inputs from the rest of the system.
And, the outputs of both instances are compared at any clock cycle. In normal condition, the comparison should never fail
If the comparison fails, this means that one of the two instances has a problem. Then a safety error is raised to the safety manager module to enter fault reaction scenario.
We can imagine some variations of the lock-step mechanism, but the principles remains the same
If we want to do the same with an FPGA without context switch, then we have to duplicate the user function, which takes twice as FPGA resource (in other words, the user algorithm can use only 50% of the FPGA resources)
Here we propose a new implementation of the lock-step principle.
We program twice the same algorithm in FLU and make them executed in a fast time sliced manner thanks to context switch.
Both context are programmed such as they use the same FLU inputs but drive different FLU outputs
Then we manage to compare the outputs of both context (with as external dedicated logic) and check that they are identical.
The advantage is that the user algorithm can occupy 100% of the FLU resource The invention can be formalized as follows:

1. An arrangement (300), comprising (i) a matrix (200) with (a) a plurality of programmable logic units (210) and (b) a plurality of first one bit clocked storage elements (20), said programmable logic units and first one bit clocked storage elements being arranged in an array, the arrangement being adapted for sequentially execution of at least two tasks, whereby for each of said first one bit clocked storage elements a data store and restore circuit (10) is provided for local storing or restoring the respective values per task of said first one bit clocked storage elements.

2. The arrangement of claim 1, further comprising an overall control system (230) for generating instructions or signals for said data store and restore circuits in accordance with the safe switching of the execution of said tasks.

3. The arrangement of claim 1 or 2, wherein said data store and restore circuit being arranged in that said storing or restoring is performed in 1 clock cycle.

4. The arrangement of any of the previous claims, further comprising a data memory (310), external to said system, wherein said data store and restore circuit is provided for (i) pre-loading data related to one task from said memory into said data and restore circuit and/or (ii) post-storing of data related to one task in said data store and restore circuit to said data memory, whereby said pre-loading and/or post-storing can be performed while another task is executed without disturbing said task execution.

5. The arrangement of any of the previous claims, further comprising a configuration bit memory (320) whereby for each of said programmable logic unit, a configuration bit storage circuit (700) is provided, wherein said configuration bit storage circuits, each comprising (i) a third one bit clocked storage element (710); (ii) a first input for said third one bit clocked storage element, (iii) at least one fourth one bit clocked storage element (720), connected to said fourth one bit clocked storage element; and wherein said overall control system is further provided for controlling said configuration bit storage circuit; and said overall control system comprising input means for receiving instructions and circuitry, acting in accordance with said received instructions, being capable to further generate clock signals for said configuration bit circuit to (i) store a configuration bit in said third one bit clocked storage element from said memory; or (ii) load a configuration bit from said third one bit clocked storage element into a (or one of said) fourth one bit clocked storage element(s).
6. The arrangement of claim 5, wherein one or more of said third or fourth one bit clocked storage element being a flip flop.
7. The arrangement of claim 6, whereby said configuration bit storage circuit being arranged to load a configuration bit from said third one bit clocked storage element into a (or one of said) fourth one bit clocked storage element(s) in 1 clock cycle.
8. The arrangement of any of the previous claims 5 to 7, wherein a plurality of said configuration bit storage circuits are arranged in series.
9. The arrangement of claim 5, wherein a plurality of said third one bit clocked storage elements are arranged in series, in particular the output of one third one bit clocked storage elements serve as said first input for the next third one bit clocked storage element in the series.
10. The arrangement of any of the previous claims 5 to 9, wherein the memory and a plurality of said configuration bit storage circuits and/or shift registers are arranged to enable parallelization of said store operations.
11. A platform, suitable for automotive, comprising an electric power train; and an electric power train management hardware, providing control for said electric power train, said management hardware comprising a heterogeneous hardware system comprising at least one software programmable unit and at least one hardware programmable unit, comprising any of the arrangements of any of the claims 1 to 10.
12. A method for sequentially execution of at least two tasks on an arrangement, comprising (i) a system with (a) a plurality of programmable logic units and (b) a plurality of first one bit clocked storage elements, said programmable logic units and first one bit clocked storage elements being arranged in an array, the method comprising generating (i) instructions or signals for said data store and restore circuit in accordance with the safe switching of the execution of said tasks; and (ii) providing those to the data store and restore circuit, provided for each first one bit clocked storage elements, to local storing or restoring the respective values per task of said first one bit clocked storage elements.
13. The method of claim 12, adapted for an arrangement comprising a configuration bit memory and, wherein for each of said programmable logic unit, a configuration bit storage circuit is provided, wherein said configuration bit storage circuits, each comprising (i) a third one bit clocked storage element; (ii) at least one fourth one bit clocked storage element, connected to said fourth one bit clocked storage element; the method further comprising: (iii) generating clock signals for said configuration bit circuit to (i) store a configuration bit in said third one bit clocked storage element from said memory; or (ii) load a configuration bit from said third one bit clocked storage element into a (or one of said) fourth one bit clocked storage element(s).
14.—A method for sequentially execution of at least two tasks on an arrangement, comprising (i) a system with (a) a plurality of programmable logic units, (b) a plurality of first one bit clocked storage elements, said programmable logic units and first one bit clocked storage elements being arranged in an array, and, wherein for each of said programmable logic units, a configuration bit storage circuit is provided, the method comprising generating clock signals for said configuration bit circuit (a) while one task is executed to store a configuration bit related to another task in said configuration bit storage circuit; (b) within one clock cycle configure said programmable logic units based on said configuration bits to be able to execute said other task; and (c) start execution of said other task.
15. The method of claim 14, further comprising generating instructions or signals for said data store and restore circuit provided for each first one bit clocked storage elements (a) while said one task is executed, to prepare local restoring the respective values related to said other task in said first one bit clocked storage elements; (b) within one clock cycle, store those values of said other task in said first one bit clocked storage elements while storing the values of said one task.
16. A computer program product comprising computer-readable code, that when run by the overall control system (230) of an arrangement as in claim 2 causes execution of the methods of any of the previous method claim 12 or 13 or 14 or 15

The invention claimed is:
1. An arrangement, comprising
A) a matrix with
  (a) a plurality of programmable logic units;
  (b) a plurality of data store and restore circuits, each data store and restore circuit of the plurality of data store and restore circuits comprising a logic input; a first one bit clocked storage element, connected to and configured to receive the logic input; a second one bit clocked storage element, configured to receive an output of the first one bit clocked storage element; and a switching element that is configured to selectively input the logic input or an output of the second one bit clocked storage element to the first one bit clocked storage element;
  wherein the plurality of data store and restore circuits are arranged such that the logic input of each data store and restore circuit of the plurality of data store and restore circuits is directly connected to an output of a programmable logic unit of the plurality of programmable logic units; and wherein an output of the first one bit clocked storage element of the plurality of data store and restore circuits is connected to an input of a programmable logic unit of the plurality of programmable logic units;
  wherein the programmable logic units and first one bit clocked storage elements are arranged in an array, the arrangement being adapted for sequential execution of at least two tasks; and
B) a data memory, external to the matrix, wherein the data store and restore circuit is provided for
  (i) pre-loading values related to one task from the data memory into the data store and restore circuit and
  (ii) post-storing of values related to one task in the data store and restore circuit to the data memory, whereby the pre-loading and/or post-storing can be performed while another task is executed without disturbing the task execution.

2. The arrangement of claim 1, wherein
a plurality of the data store and restore circuits are designed for being arranged in series and within the arrangement are arranged in series to shift information from one to the other;
each data store and restore circuit comprises a second switching element; and
the arrangement in series occurs via the second switching elements.

3. The arrangement of claim 2,
wherein the second one bit clocked storage element of each of the plurality of circuits form a plurality of one bit clocked storage elements; wherein the data store and restore circuits each comprise a respective second one bit clocked storage element of the plurality of one bit clocked storage elements, and the plurality of second one bit clocked storage elements are arranged in series to define and operate as a shift register, whereby an output of one second one bit clocked storage element of the plurality of second one bit blocked storage elements serves as an input for a next second one bit clocked storage element of the plurality of second one bit clocked storage elements in the series to establish data communication via the inputs and outputs.

4. The arrangement of claim 2,
wherein the first one bit clocked storage element of each of the plurality of circuits form a plurality of first one bit clocked storage elements; further comprising a control system controller that provides steering signals for the first switching element and provides clock signals to the first one bit clocked storage elements.

5. The arrangement of claim 4, wherein the control system controller generates a number of clock signals equal in number to a number of double-flop elements in the arrangement.

6. The arrangement of claim 1, wherein the data memory is a nonvolatile memory.

7. The arrangement of claim 1,
wherein the logic input is a first logic input and the switching element is a first switching element:
wherein each data store and restore circuit of the plurality of data store and restore circuits further comprises:
a second logic input;
a second switching element; and
a further second one bit clocked storage element;
wherein the second switching element is configured to switch between the second logic input, an output of the first one bit clocked storage element, and an output of the second one bit clocked storage element, and to output to an input of the second one bit switching element;
wherein the first switching element is configured to switch between the first logic input, an output of the second one bit clocked storage element and an output of the further second one bit clocked storage element, and to output to an input of the first one bit clocked storage element; and
wherein the first one bit clocked storage element is configured to output an output signal to an input of the second one bit clocked storage element, and to output to an input of the further second one bit clocked storage element.

* * * * *